April 16, 1963

R. L. OPILA ETAL 3,086,008

METHOD FOR MODIFYING A CARBOHYDRATE MATERIAL

Filed Sept. 22, 1958

INVENTORS.
Robert Leon Opila
Adolph Paul Oleson,
Mildred Oncken
By Attys.

April 16, 1963  R. L. OPILA ETAL  3,086,008
METHOD FOR MODIFYING A CARBOHYDRATE MATERIAL
Filed Sept. 22, 1958  4 Sheets-Sheet 2

INVENTORS.
Robert Leon Opila
Adolph Paul Oleson,
By Mildred Oncken
Atty.

April 16, 1963  R. L. OPILA ETAL  3,086,008
METHOD FOR MODIFYING A CARBOHYDRATE MATERIAL
Filed Sept. 22, 1958  4 Sheets-Sheet 3

P about 3¾" min.   O about ¼"
S  "   2¾" min.    A  "   15°
W  "   1"          B  "   130°
R  "   3/4"        X  "   3Y
H  "   3/16"     ᵥ/min. about 400-800
thickness of layer about ⅛" to ⅜"

INVENTORS.
Robert Leon Opila
Adolph Paul Oleson
By Mildred Oneken
Atty.

April 16, 1963   R. L. OPILA ETAL   3,086,008
METHOD FOR MODIFYING A CARBOHYDRATE MATERIAL
Filed Sept. 22, 1958   4 Sheets-Sheet 4

INVENTORS.
Robert Leon Opila
Adolph Paul Oleson
By Mildred Oncken Atty.

United States Patent Office 3,086,008
Patented Apr. 16, 1963

3,086,008
METHOD FOR MODIFYING A CARBOHYDRATE MATERIAL
Robert L. Opila, Westchester, Ill., and Adolph P. Oleson, Fullerton, Calif., assignors to Corn Products Company, a corporation of Delaware
Filed Sept. 22, 1958, Ser. No. 762,464
17 Claims. (Cl. 260—233.3)

This invention relates to a machine and method for treating granular or pulverulent materials by subjecting the same to actions involving mechanical, thermal, and/or chemical treatment, as desired. The broader aspects of the present invention are applicable to different specific fields of use or to the performance of different specific processes and/or to the production of different specific end products.

This invention includes a method and apparatus for obtaining a high rate of heat adsorption from a heat source to the material undergoing modification and for obtaining a high rate of release of moisture from the material undergoing modification to the surrounding gaseous atmosphere. By virtue of these high rates of heat transfer and moisture release, short reaction times are possible.

This invention also includes an improved method and apparatus for the continuous movement and/or mixing of particulate solids of extremely small size, said moving and/or mixing resulting in high uniformity without dusting, thereby eliminating the hazard of explosion for those materials undergoing thermal modification in the semi-dry or dry state.

This invention also includes an improved method and apparatus for zone control of temperature to induce the conditions required to obtain the desired reaction.

This invention also includes an improved method and apparatus for zone control of atmosphere to induce the conditions required to obtain the desired reactions without recourse to vacuum apparatus, blowers, or to inert atmospheres.

A specific application of the invention is in processes and apparatus for the continuous thermal modification of carbohydrates, particularly starch, by treating them in thin sheets or layers of particulate solids with continuous movement and mixing of said solids and with or without the application of other influences. Another specific application is in processes and apparatus for making derivatives of carbohydrates, e.g., ethers, esters. The term carbohydrate material as used herein is intended to include carbohydrates in raw or modified form and derivatives thereof.

This invention also includes an improved apparatus for the reacting of particulate polysaccharides in the dry or semi-dry state and for promoting the conditions required to obtain the desired extent of reaction.

This invention also includes an improved process for preparing pyrodextrins, and an apparatus which permits great flexibility in adjusting variables influencing the reactions of dextrinization resulting in products having a wide range of properties.

This invention also includes a process and apparatus for the thermal modification of dried starch sirups resulting in modified carbohydrate materials having dextrin-like properties and being eminently useful as adhesives or as adhesive components.

This invention also includes a process and apparatus for the thermal modification of dried starch conversion sirups containing varying amounts of formaldehyde resulting in modified carbohydrate materials having higher viscosity and better adhesive properties than the modified carbohydrate materials described immediately preceding.

This invention also includes an improved process and apparatus for reacting dried granule or gelatinized starch or starch derivatives containing previously dissolved salt or starch derivatives containing previously dissolved salt reagents resulting in starch esters, with improved properties.

It is known in the art, for example, to apply heat to dry or semi-dry starch in particulate form for purposes of modification. The art has endeavored to increase the rate at which heat can be transferred to the material being treated. It has generally been proposed to increase the rate of heat transfer by employing heat at high temperature thereby increasing the temperature differential. In the case of liquod or vapor heating medium, the proposal has been to minimize the resistance of the surface film in contact with the heating medium to reduce the resistance to heat transfer. Further, it has been proposed to improve the rate of heat transfer by agitation or stirring the particulate solids thereby to bring about a change in the particles exposed most directly to the heat source. We find that the most important limiting factor in transferring heat to a mass of particulate material is the conductivity of the material being heated. This fact appears to have escaped the attention of the art.

This invention recognizes the aforesaid limiting factor, and provides a method of equalizing and of minimizing the effect of the same. The invention teaches that the unfavorable effect of the low conduction of heat which is intrinsic in particulate solids such as, for example, starch and its derivatives is minimized by using thin sheets of particulate solids at substantially the same depth at any cross section, and causing the particles therein to move longitudinally and also internally of the sheet so as to mix while exposed to the heat source. This results in the transfer of heat individually to the particles in succession as they are brought into position for such exposure to the heat source and tends to render the rate of heat transfer substantially independent of the conductivity of the material. As a result of this independence, the rate of heat absorption by the material is surprisingly rapid, so that the product can be heated to what are considered by the art to be extremely high temperatures in very short time.

The rapid rate of heat absorption is accompanied by a correspondingly high rate of moisture release from the dry or semi-dry particulate solids. The high rate of moisture release is due to the rapid rate of heat absorption and to the fact that substantially each particle is exposed to the surrounding gaseous atmosphere. Moisture release is not impeded, since the thin sheet of material is continuously moved, broken open and mixed. As is pointed out in the examples presented hereinafter, a high rate of moisture release is especially beneficial in obtaining products having the desired properties. This invention also teaches that control of moisture release through zone control of atmosphere without recourse to vacuum apparatus or inert atmospheres is beneficial, for example, for pyrodextrinization processes.

This invention in its preferred form makes use of a horizontally mounted differential reciprocating or vibrating trough conveyor equipped with mixing elements and means for imparting heat to the materials requiring modification. Continuous unbroken differential reciprocating or vibrating conveyors of the prior art, lacking breakup means, have the disadvantage of transporting materials in what is termed "slug" flow by those familiar with the art of transporting materials by this means. In "slug" flow, the material is conveyed without mixing, that is, the individual particles do not change their positions with reference to each other while the material is transported. This is easily demonstrated by carefully depositing a layer of material of different color, as for example, iodine-stained powdered corn starch, on a layer of white unmodified powdered corn starch, both layers then being transported by a continuous, unbroken vibrating conveyor. The two layers remain intact throughout the length of the conveyor, regardless of the shape of the conveyor, be it a flat-bottomed open trough or a closed circular conduit. This type of "slug" flow persists in elevator-type vibrating conveyors where the conveyor is in the shape of a helix or spiral, since the vibrations are transmitted tangentially to the elevator-type vibrating conveyors and the amplitude of the vibrations describe an extremely small arc.

This lack of mixing or mingling of material transported in vibrating conveyors, whether the conveyors are straight or spiral, open or closed, is eliminated in our invention through use of novel mixing elements which provide a discontinuous, broken conveying surface. By means of these mixing elements, the material being transported is intermingled and mixed during the thermal modification, thus resulting in products of exceptionally high uniformity.

According to this invention, the particulate material to be treated is disposed in a thin layer preferably in a trough or channel, and the layer of material is urged forward in the channel, as for example by vibrational impulses, or otherwise. The material is maintained of substantially the same depth at any cross section, but at intervals along the length of the channel, the flow of material encounters resistance which brakes or retards forward flow and the material tends to pile up, and thereby gain potential energy which may be expended in expediting or accelerating flow after the region or influence that caused pileup is passed. This retarding effect may be produced by a transverse ridge in the bottom of the channel. As the traveling material encounters the rise or the acclivity of the ridge, its forward rate of motion is retarded and the layer compacts and grows thicker; then as the material passes over the crest and reaches the declivity, its forward rate of motion is increased, and the layer grows thinner both in dimension and in density. The angle of declivity relative to the horizontal is preferably steeper than the angle of acclivity, but at all events is obtuse enough, taking into account the relation to the forced motion, the overall rate of advance of the material, and the character of the material, to be self-scouring. That is to say, the material must not lodge in a stationary pocket at either the front or back of the mixing element. As the layer of material passes over the crest of the ridge, there is a tendency for it, if it is pulverulent like starch, and has a degree of coherence, to form cracks or fissures, and for the material to break off in more or less coherent slabs which tumble down the declivity producing a definite mixing of the particles. In the specific examples herein given, mixing is found to have occurred after passing over four such ridges. In such mixing, particles deposited on top of the layer will be found throughout the layer. By such action, all the particles are brought at random into and out of contact with the heated surface, or exposed to a source of radiant heat, as the case may be.

It is to be noted that the mixing elements of this invention operate on the relative forward movement of the layer of material with respect to the elements. They are in theory capable of performing their function quite independently of any vertical component of motion of the conveyor bottom. They act much as do plows to raise, break up, and allow to drop, the layer of material under treatment. While the specific form of mixing elements herein disclosed operate like a subsoil plow, they might instead be constructed like an ordinary topsoil plow with a mould board operating to produce a complete overturning of the particular strip or furrow or series of furrows. Less dusting tends to result from the use of the subsoil or preferred type of mixing element.

Also, it is to be noted that the breakup action is not in slugs, each corresponding to a reciprocation of the support, as in devices of the prior art, but essentially in accordance with the cohesiveness of the material being "plowed" or treated just as soil breaks up under the plow in accordance with its consistency. While the vibration of the supporting surface by forced reciprocation may aid in the breakup, it is not the controlling factor in the breakup, although it is in the levitation of the material.

The use of thin layers without continuous movement and mixing of the particulate solids does not accomplish the desired results. Where thin layers of particulate solids are static, as in the case of materials transported on an endless conveyor belt, heat must be transferred to the particles not directly exposed to the heat source by means of conduction of heat through the particles exposed to the heat source. As a result, a temperature gradient must exist between the material exposed directly to the heat source and the material within the thin layer which is removed from the heat source. Similarly, a gradient in moisture content exists due partly to the temperature gradient and partly because all of the material is not exposed to the vapor carrier. As a result of this lack of exposure, the water vapor released from material below the surface of the layer must travel through the material between it and the surface. In the extreme case, the material at the surface would be completely free of moisture, whereas the material at the bottom of the layer could contain 2 to 3% moisture as is. These temperature and moisture gradients cause non-uniformity in the product, since reaction rates are dependent upon temperature and for the examples cited hereinafter, moisture content determines either the type of reaction that will occur or whether the desired reaction will occur at all. Where thin layers of particulate solids are transported in "slug" flow, as in unbroken, continuous vibrating open trough or closed conduit conveyors, heat must also be transferred to the particles not directly exposed to the source, since, as previously stated, particles in "slug" flow do not change their position relative to each other. The resulting temperature gradient across the layer of material causes non-uniformity.

Where materials are treated in closed conduit conveyors, wherein heat is applied indirectly, the degree of non-uniformity increases as the attempt is made to build apparatus with higher production rates. As conduit diameter increases, so also does the conduction path which is the distance to the center of the material. In our invention, the apparatus may be made as wide as desired without impairing the action in any way. The depth may be maintained independently of the width.

In this means of material transport, partial suspension of the material occurs due to the vibratory motion of the conveyor. In effect, the apparent bulk density of corn starch, for example, is reduced from 40 pounds per cubic foot for a static layer to about 20 pounds per cubic foot for a layer of starch transported in this conveyor. Removal of moisture during thermal modification is aided because of the void spaces occurring in a layer of material transported in this type of apparatus, thus reducing considerably the resistance to moisture removal encountered in a static layer. However, the rate at which moisture is released is dependent upon the rate at which heat is transferred to the material to supply not only the sensible heat, but also the heat of vaporization.

Those familiar with the art of thermal modification of polysaccharides are aware that apparatus commercially available imposes limitations on the types of semi-dry or dry thermal modification which may be carried out in any one unit of equipment. For the processes described herein, the use of apparatus wherein air supplies the heat required for thermal modification is not practical or safe because of the high temperatures required to effect thermal modification of the material. In order to attain these high material temperatures, a relatively low volume of air at temperatures of the order of 370 to 540° C. or a high volume of air at 175 to 260° C. is required. Use of high air temperatures could result in an explosion, since these temperatures are near or in excess of the auto-ignition temperature of starch. High volumes of air complicate design of the apparatus since excessive dust losses result and elaborate dust recovery equipment is required. Use of the lower temperature range does not preclude the possibility of explosion since a requirement for the majority of processes described herein is that the carbohydrate material be substantially anhydrous before the desired reactions can occur. An electrostatic discharge may then be the cause of an explosion.

The use of equipment where heat is transferred to the material undergoing thermal modification through heat transfer surfaces also imposes economic as well as process limitations on the types of reactions that may be carried out. Typical of this type of equipment are the dextrin cookers. Commercial dextrin batch cookers can be classified as air-swept or vacuum type. In the air-swept type, air, drawn over the bed by an exhaust fan, acts as a carrier for the water vapor released by the starch undergoing modification. In the vacuum type, the water vapor is withdrawn from the cooker by a vacuum pump or steam ejector with the cooker operated at a very low internal absolute pressure. Both cookers have a large inventory in process varying from one-half to four tons of starch.

In both types of cookers, the high ratio of volume of material to heat transfer area results in the conductivity of the material being the limiting factor in rate of heat adsorption. As a result, the time required to attain the optimum temperature, from the standpoints of economics and ease of control of the process, is one to three hours depending on the type of product desired. A knowledge of the art of thermal modification of carbohydrates is required to understand the implications of this low rate of heat adsorption by the material being processed.

The art of pyrodextrinization of starch is the oldest and probably most common form of thermal modification of carbohydrates. By pyrodextrinization of starch, it is meant the thermal degradation of semi-dry or dry starch, with or without the addition of a catalyst, resulting in products which will vary in their solubility in cold water from very slightly soluble (less than 1%) to products which are completely soluble, thus including the items of commerce known as white dextrins, canary dextrins and British gums. Semi-dry starch is defined here as containing a minimum of 8% moisture as is and no more than 20% moisture as is, while a dry starch is defined as containing less than 8% moisture as is.

According to Kerr and Cleveland (Die Starke 5, No. 10, pp. 261–266, October 1953) hydrolysis (depolymerization) and condensation (polymerization), and possibly transglycosidation, are the principal reactions occurring during pyrodextrinization to produce "white dextrins" and "canary dextrins." The starch subjected to dextrinization conditions is always hydrolyzed, and the bonds in starch which are hydrolyzed appear to be primarily the alpha, 1–4 glucosidic linkages. The reaction is usually promoted by an acid catalyst or metallic halide salt, although organic acids formed by oxidation of the carbohydrates act as catalysts in the preparation of British gums. The rate of hydrolysis is dependent upon temperature and acid concentration, while the extent of hydrolysis is determined by the initial moisture content and rate of moisture removal. Water is required for hydrolysis to occur, and the rate of hydrolysis decreases as the moisture content of the starch is reduced.

Catalyst concentration is a controlling variable in rates of hydrolysis, but different batches of starch may react at different rates for the same amount of catalyst. The causes of these variations between starches are not known, but conversion rates are low and relatively unaffected by catalyst concentrations below a critical value which varies with the starch.

Condensation occurs subsequent to hydrolysis and consists of a repolymerization in which terminal aldehyde units and hydroxyl groups react to form a branched polymer. The bonds formed by condensation are primarily alpha, 1–6 and 1–3 glucosidic linkages although 1–2 bonds may also be formed.

Condensation occurs only at low moisture contents and the rate of reaction depends upon the extent of hydrolysis, the acid concentration, and the temperature.

The extents of hydrolysis and condensation are reflected by the various means used to characterize dextrins, such as the reducing sugar content of the dextrin, calculated as dextrose, the viscosity of a dextrin paste, and the clarity of a dextrin paste which is a measure of the relative amount of linear fragments which are active in retrogradation (the increase in viscosity of a dextrin paste with time is an apparent result of retrogradation), and the solubility of a dextrin in water at 25° C.

Dextrins are normally characterized by at least two of the characteristics mentioned above, and these are usually solubility and viscosity. Fluidity is the measure of viscosity used in the art of dextrinization, and fluidity has an inverse relation with viscosity. That is, a paste having a high viscosity will have a low fluidity, and conversely, a low viscosity paste will have a high fluidity.

The effects of hydrolysis are an increase in fluidity (reduction in viscosity) of the dextrin paste, an increase in the reducing sugar content of the dextrin, and an increase in the cold water solubility of the dextrin.

The effects of condensation are: (1) a decrease in the reducing sugar content of the dextrin; (2) a decrease in the fluidity of a dextrin for a given solubility; (3) an improvement in the stability of a dextrin paste, since highly branched molecules do not tend to associate, thus reducing or eliminating retrogradative tendencies; (4) an improvement in the clarity of a dextrin paste, since the hydrolyzed linear fragments of starch are a party to the condensation reaction, and are not available for association and ultimately crystallization; (5) a reduction in the hygroscopicity of the product since products having a high reducing sugar content (above about 5%) tend to pick up moisture and thus become sticky when a film of dextrin is exposed to a high humidity atmosphere; and (6) an improvement in the adhesiveness of the product.

There is an upper limit to corn dextrin fluidity at any given solubility, and this upper limit is obtained in cooks where hydrolysis only occurs. Dextrins of lower fluidity, for a given solubility, are obtained by the condensation reaction, which, as noted previously, begins when sufficient moisture has been removed from the material to permit condensation. For a starch of given moisture content, removal of moisture and hydrolysis must proceed at definite related rates in order for condensation to begin at the proper time, so that the desired combination of properties is obtained. The number of combinations of properties is indicated by the fact that hundreds of grades of dextrins are commercially available.

In batch conversions, rate of moisture removal is controlled by ventilation with air drawn across the bed or by vacuum. Because of the high ratio of starch volume to heat transfer area in batch cookers, rate of heat absorption by the material is low which in turn results in very slow rate of moisture removal in the case of the air ventilated cooker and slow removal of water from the vacuum type cooker, comparing both with our invention.

The very slow rate of moisture removal in the air ventilated cookers results in the production of a characteristic high fluidity (low viscosity) dextrin for given solubles. Since rate of moisture removal is low, the starch undergoes substantially only hydrolysis. It is well known in the art, that dextrins resulting from straight hydrolysis have great retrogradative tendencies.

A condensed dextrin can be produced in air swept batch cookers from low moisture starch, but the low moisture content limits the extent of hydrolysis thereby limiting the extent of condensation. Thus the stability (lack of tendency to retrograde) of the dextrin paste is improved slightly, with the amount of improvement being related to the extent of hydrolysis. For a dextrin paste to be completely stable, it is essential that the linear fraction of corn starch be eliminated.

Reducing the starch volume in the cooker permits use of a higher initial moisture content and improves the rate of moisture removal, thereby yielding a highly condensed dextrin having a greater extent of hydrolysis than is produced by means of the starch with a low initial moisture content. This approach is uneconomical since production rate is reduced at least 50%. The vacuum type cooker is an improvement in this respect since this apparatus permits use of a large starch volume while yielding dextrins having a characteristically low fluidity (high viscosity) for given solubles. Because of the large starch volume, sufficient hydrolysis occurs prior to the onset of the condensation reaction to result in dextrins having high fluidities. By means of the vacuum system, the moisture content of the material undergoing pyrodextrinization is easily reduced to a low moisture level, thereby permitting condensation to occur to its fullest extent. These dextrins form relatively stable pastes, but these pastes are necessarily more viscous because of the formation of highly branched molecules through condensation.

As has been pointed out previously, the rate of hydrolysis is dependent upon moisture content, temperature and catalyst concentration. Since hydrolysis of starch will begin to occur at the same starch temperature required to initiate water removal, the extent of hydrolysis is dependent upon the initial moisture content of the starch and the concentration of catalyst in the starch.

Control of initial moisture content is a comparatively simple drying operation and no discussion of the point is deemed necessary here.

The control of catalyst concentration is complicated by the starch variations mentioned previously. Chemical means for determining the catalyst inactivating power of a batch of starch are applicable to a limited range of products and are essentially of academic interest. Trial cook procedures are time consuming and expensive since samples taken in the course of the cook must be characterized in order to determine the rates of reactions. Catalyst concentration in commercial operation of batch cookers is then based upon past experience which, of course, is subject to error due to the variation in response of various batches of starch to the same catalyst concentration.

Because of the long overall times required in commercial batch cookers to effect the desired modification (about 2 hours for low solubles white dextrins and 6 to 8 hours for canary dextrins), catalyst concentration must be controlled very closely, in order that the desired combination of hydrolysis and condensation is obtained for a given soluble. If too much acid is added for a given initial moisture content and a given rate of water removal, hydrolysis occurs at a high rate resulting in a higher than desired rate of solubles formation with the product having a higher fluidity than desired for a given soluble. The high rate of solubles formation makes the cook difficult to control and usually results in an overmodified product. If too little acid is added, the product has a lower fluidity than desired for given solubles. If the amount of acid added to the starch is less than that inactivated by the starch, then a British gum type product results if sufficient roasting time is allowed.

Similarly, in the case where dextrins are prepared continuously, as in a vibrating helical coil as disclosed by C. Ziegler et al. in U.S. Patent No. 2,818,357, the products produced therefrom will be essentially products of straight hydrolysis since removal of moisture is difficult if not impossible to achieve in this type of closed apparatus. In this process, Ziegler et al. make use of a preliminary drying step wherein the moisture content of starch is reduced to 3 to 5% prior to entering the apparatus in order to control the extent of hydrolysis. As pointed out before, the extent of hydrolysis is dependent upon rate of moisture removal and the catalyst concentration as well as the initial moisture content. Since the rate of moisture removal is low in the apparatus of Ziegler et al., the active catalyst concentration must be maintained at a low level to fix the extent of hydrolysis and the control of catalyst concentration is complicated by the starch variations mentioned previously.

From the above, it can be concluded that a high percentage of undesirable product is manufactured by the batch and continuous processes described. While these products are usually acceptable as other products, only one-third to one-half of the production may be satisfactory for the desired product.

This difficulty is avoided in our improved process for dextrinization by the nature of our invention. Our invention makes use of a very low ratio of starch volume to heat transfer area, thereby resulting in an extremely high rate of heat absorption and a correspondingly high rate of moisture removal. In order to obtain the desired extent of hydrolysis under these conditions, it is imperative that a much higher catalyst concentration be used than can be used for the dextrinization process in batch cookers, thus minimizing the effect of starch variations. In the case of batch cookers, the amount of active catalyst required for the production of low solubles (less than 20 percent) dextrins is very low. Accordingly, if a fixed amount of catalyst is used, the reaction rate will vary over a wide range and can be as much as 5 times the desired reaction rate, thus achieving the desired result in ⅕ the time. If the water removal rate corresponds to the desired reaction rate, then only ⅕ of the water is removed and instead of starting the condensation reaction, the hydrolysis rate continues at 5 times the expected rate.

The high concentration of catalyst required in our process to produce this same low solubles dextrin permits control of the extent of hydrolysis by controlling the rate of moisture removal. This time will in turn be controlled by a slight adjustment in temperature and a slight adjustment in moisture removal rate. This improved method does not preclude the possibility of producing undesirable product, but does result in reducing the production of undesirable product to a very low quantity, since a very small inventory of material is in process at any one time. A further advantage of our process is the ability to produce a partially condensed low solubles white dextrin as the result of our high rate of moisture removal. As mentioned previously, condensation reduces the retrogrative tendency of the dextrin paste. Dextrins of this type are virtually impossible to prepare in air swept cookers and are difficult to control in vacuum cookers.

In the case of batch cookers, one cannot learn whether the desired product will be produced until the roasting period is at least three-quarters completed, whereupon it is too late to make any adjustments in the process conditions. In the case of continuous dextrinization, as practiced by Ziegler et al., little can be done to change moisture removal rates when active catalyst is in excess of that required. Air can be forced through the coil in very limited amounts, since the air will act as a conveying medium at velocities in excess of ten feet per second, thus materially reducing the residence time of some of the material undergoing modification, thereby resulting in non-uniformity of product. In our improved process, production of undesirable products is limited to the initial period of production (at most 20 minutes plus one retention time, a loss of less than 30 minutes) during which time the product is characterized. With good control of the easily controlled process variables (these include initial moisture content, product temperature, ventilation rate, feed rate, and retention time) we have experienced little difficulty with batch to batch variations in the starch, since the variation in starch is minimized through use of high catalyst concentration. Essentially, the conditions used for similar preparations in the past are used as the basis for new production and the temperature is adjusted no more than ±5° C. to produce the desired product. Once the exact conditions have been determined, it is a simple matter to compensate for a drift in the product caused by a drift in the starch variability.

In addition, our invention does not require use of specially dried starch, as in the apparatus of Ziegler et al. where the moisture of the starch must be pre-dried to 5% or less by means of a vacuum drier. We are able to use starches dried to commercial moisture contents (i.e., 10 to 12% moisture) in the preparation of dextrins.

We are able by means of our invention not only to make and match dextrins by known processess but we can do this more efficiently. We can also make dextrins which are superior to known dextrins as concerns color, i.e., much lighter in color, and retrogradation. Since we can control the types and extents of the reactions by our invention we can obtain dextrins of uniform quality and hence we do not make any undesirable material which must be discarded or blended with better material.

The apparatus of our invention has the advantage of being self-cleaning thereby permitting great flexibility in the types of products and the sequence in which they may be produced. This eliminates the time consuming and costly cleaning of batch-type cookers when product changes must be made.

Our invention provides an improvement upon a known process for the production, from dried starch conversion sirups, of modified carbohydrate materials having dextrin-like properties, and being eminently useful as adhesives or adhesive components. Said process is disclosed in U. S. Patent No. 2,563,014, of August 7, 1951, to Harry W. Durand. Our process and machine provide a more efficient means of removing moisture rapidly to reduce the content of water to that desired and also rapidly removing water of condensation as fast as it is formed.

Because of the high rate of heat absorption, and because of the resulting high rate of moisture removal from the material undergoing thermal modification made possible by our invention, our invention is particularly well suited for this type of process, and is superior to those commercially available.

Among the types of equipment which can be used for this thermal modification, are commercial dextrin cookers, either air-ventilated or vacuum type, tray driers, and conveyor belt driers.

Air-swept dextrin cookers have the disadvantage of low rate of moisture removal, as previously discussed, so that the extent of condensation is limited unless excessive color formation is to be tolerated. Because of the long time required to reduce the moisture content of the sirup solids to the critical value required for the onset of the condensation reaction, hydrolysis of the sirup solids occurs as well as oxidation and caramelization of the sirup solids. In order to obtain products having the desired combination of properties, hydrolysis, oxidation and caramelization of the sirup solids must be eliminated or minimized.

Vacuum-type dextrin cookers are better suited for this process, since the rate of water removal is higher than for the air-swept dextrin cooker, thereby reducing the extent of hydrolysis prior to the onset of the condensation reactions. However, vacuum cookers require a large capital and also have high maintenance costs to maintain the high vacuum required. Our invention is not dependent upon use of vacuum equipment, and therefore not affected by the fluctuation in rate of moisture removal experienced in normal day to day operation of commercial vacuum equipment. Any variation in rate of moisture removal between batches will result in batch to batch variation in the product. Since our invention is a continuous process, this batch to batch variation is eliminated.

Use of equipment wherein the layer of sirup solids is static, as in tray driers or conveyor belt driers, causes non-uniformity of product because the conductivity of the material undergoing modification limits the rate of heat absorption and also influences the rate of moisture removal. The resulting temperature and moisture gradients will contribute to non-uniformity since, in the extreme case, hydrolysis could occur in the portion of the static layer away from the heat source, while condensation is occurring in the portion of the layer exposed to the heat source. This shortcoming is eliminated in our invention, since material processed in our apparatus is continuously moved and mixed, thereby insuring uniformity.

In an improvement upon the process of U.S. Patent No. 2,563,014, a starch conversion sirup containing added formaldehyde is dehydrated to isolate the solid materials therein, and these isolated solids are heated under conditions conducive to polymerization. This improvement is the subject of U.S. Patent No. 2,836,591 to Harry W. Durand.

The polymerization mentioned above consists of two separate reactions, one where the carbohydrate molecules are polymerized by chemical condensation, and the other where formaldehyde condenses with hydroxyl groups to form hemiformals (hydroxymethyl ethers) which in turn, under certain circumstances, can either react with adjacent hydroxyl groups in the same molecule, giving cyclic formals, or with hydroxyl groups in another molecule to give cross-linked polymers through oxymethylene bridge formation.

The amount of formaldehyde required to achieve the desired degree of polymerization is closely related to the reducing sugar content, calculated as dextrose, of the starch conversion sirup. Accordingly, if the desired degree of polymerizaiton is to be attained, it is essential that hydrolysis be eliminated during thermal modification of the isolated solids, since control of the manufacturing operation is greatly simplified.

A further requirement of this process is that the carbohydrate-formaldehyde mixture be essentially anhydrous to permit the formation of oxymethylene bridges by the formaldehyde and carbohydrate. The phrase "essentially anhydrous" as used here refers to a moisture content not exceeding one percent.

Based on the requirements of this process, it is imperative that moisture removal proceed at a very high rate in order to remove the free water contained in the isolated solids as well as any water formed by chemical condensation or by oxymethylene bridging. A high rate of water removal will eliminate or minimize the hydrolysis reaction, and promote the conditions required for chemical condensation and oxymethylene bridging.

Our invention and improved process for the thermal modification of sirup solids containing added formaldehyde achieves the desired high rate of moisture removal, thereby minimizing or eliminating hydrolysis, and promoting the conditions required for chemical condensation and oxymethylene bridging. This high rate of moisture removal is the direct result of the very low ratio of sirup solids volume to heat transfer area, the ramifications of which have been discussed previously.

Use of air ventilated dextrin batch cookers is not practical since reduction of moisture content to one percent or below cannot be accomplished without a deleterious effect on the product due to caramelization. Apparatus wherein the sirup solids are thermally modified in a static bed is also unsatisfactory because of the product non-uniformity inherent in apparatus of this type. Use of drying equipment, such as a rotary drier or a flash drier, is not practical because of the high product temperature (in excess of 120° C.) required to promote the oxymethylene bridging reaction. An inert atmosphere at temperatures of the order of 400° to 550° C. must be supplied to the drying equipment to effect the modification and to preclude the possibility of an explosion. Operation of this sort is uneconomical and commercially unfeasible because of the operating expense and hazards involved. The apparatus of Ziegler et al. cannot be used because of the difficulties involved in removing moisture from the apparatus.

A vacuum-type dextrin cooker is best suited, of all the commercial equipment available, for the thermal modification of sirup solids containing added formaldehyde, but has the disadvantages of batch variation due to fluctuation in absolute pressure maintained in the apparatus, and, as previously mentioned, apparatus of this type requires a high capital investment and high maintenance to prevent entry of air into the apparatus.

Our invention is also applicable to thermal modification of starch with formaldehyde. For example, monomeric formaldehyde may be added to an aqueous slurry of starch, or to the starch cake, followed by flash drying of the starch-formaldehyde mixture. This flash dried material may be heat treated in accordance with the principles of our invention.

Our invention also constitutes an improvement upon processes for making esters of starch and is particularly applicable in making orthophosphate esters of starch, including simple and cross-linked phosphate esters with improvements in properties. Specifically it constitutes an improvement upon the invention described and claimed in copending application Serial No. 576,524, filed April 6, 1956, by Ralph W. Kerr and Frank C. Cleveland, now Patent No. 2,884,413. This latter invention comprises the preparation of simple and/or cross-linked phosphate esters of starch by heating a starch product containing not more than 20 percent of moisture with an inorganic phosphate salt at a temperature between about 100° C. and about 160° C. The heating is carried out so as to permit evaporation of water. The pH during the heat treatment may range from 4 to 11.5. At the lower pH values, e.g., at 4 to 5 substantially only simple esters are formed while at higher pH values the proportion of di-starch phosphate (cross-linked) is increased and at about 9 to 11.5, the amount of cross-linked esters is even greater. The phosphate salts are from the group consisting of metaphosphates, polymetaphosphates, pyrophosphates, tripolyphosphates, and mixtures thereof. The starch being treated may be in granule form or pregelatinized or the esterification may be effected by roll or spray drying a slurry of starch containing the phosphate salt. Modified starches and starch derivatives may be treated also.

The purposes of thermal modification are to dry the mixture of starch and phosphate salts to prevent hydrolysis of the phosphate salts during the ensuing reaction or reactions and to heat the mixture of starch and phosphate salts to temperatures of 100 to 160° C. at which esterification and cross-linking reactions occur.

In order to obtain maximum efficiency of the phosphate salt reagents, it is imperative that hydrolysis of the phosphate salts be minimized or entirely prevented. This is accomplished by removing the water from the mixture of starch and salts before the temperature of the mixture is sufficient to promote the hydrolysis reaction. This temperature preferably is in the range of 100 to 120° C. Our invention is particularly well adapted for accomplishing water removal with this limitation in temperature because of the very low ratio of starch volume to heat transfer area, thereby promoting high rates of moisture release.

Use of equipment where air supplies the necessary heat for the reaction is impractical for making starch esters because of the high temperatures of the air required to effect the modification and the resulting danger of explosion.

A conventional air-swept dextrin type cooker does not fulfill this requirement for reasons discussed previously unless the starch-phosphate salt mixture is dried to a moisture content well below 5% before entering the cooker. To those familiar with the art of drying starches, drying to moisture contents of such low values is neither economical nor free of hazard, since the explosibility of starch increases as the moisture content is reduced.

The vacuum type cookers are better suited for effecting esterification, but because of the relatively slow rate of moisture removal, hydrolysis of the phosphate salts occurs, thereby decreasing the amount of phosphorylation occurring and obviously decreasing the efficiency of the reaction. The limitations in moisture removal of the apparatus of Ziegler et al. preclude uses of this equipment for this type of reaction.

Our invention also contemplates an improvement on the preparation of starch esters using soluble acid salts of inorganic, polybasic oxy-acids which produce anhydro forms of these acids. This latter invention is described and claimed in copending application Serial No. 560,902 filed January 23, 1956, now Patent No. 2,961,440, by Ralph W. Kerr and Frank C. Cleveland. Such invention comprises the preparation of starch esters by heating a mixture of starch and a water soluble salt of an inorganic, polybasic oxy-acid in the ortho form, the moisture content of said mixture not exceeding about 5 percent during the esterification, at a temperature within the range of about 160° C. to about 200° C., the pH during the heating not exceeding about 8.5. Examples of usable salts are acid orthophosphates, orthoarsenates, orthosulfates and orthoborates. The starch to be treated may be gelatinized or in granule form and may be modified or a derivative. Under the conditions described it is believed that the anhydro form of the ortho acid is produced in small amounts.

Esterification increases with increasing acidity, but it is to be remembered that in treating polysaccharides, such as starch, under acidic conditions, the effect of acidity on hydrolysis of the glycosidic linkages of the starch molecule must be taken into consideration. This is particularly important where high reaction temperatures and long reaction times are employed. The effect of glycosidic hydrolysis is to reduce the paste viscosity of the product.

Thus, in the preparation of starch phosphate esters for example, it is desirable to have a high rate of moisture removal to limit hydrolysis as well as to form the anhydro form of the phosphate salt so that the desired extent of phosphorylation is achieved while minimizing the reduction in paste viscosity resulting from hydrolysis. Accordingly, a phase of our invention constitutes an improvement in this type of reaction. Of all the equipment commercially available, a vacuum type cooker approaches the performance of our invention, but does not equal it. Because of the excessive time required to attain the required temperature, sufficient hydrolysis occurs to result in a paste of comparatively low viscosity for a given extent of phosphorylation.

The invention will be further described and illustrated in connection with the accompanying drawings which are of a somewhat conventional and diagrammatic character, but it will be understood that the invention is not limited thereto. The true scope of our invention is ascertainable from the appended claims.

Now in order to acquaint those skilled in the art with the manner of constructing and operating one form of our invention, we shall describe a specific embodiment of our invention in connection with the accompanying drawings in which.

Referring now to FIGURES 1–4, our apparatus consists of a relatively shallow troughlike conveyor 1 having a flat, preferably horizontal bottom 2 with an upper reaction surface 2a with vertical flanges or sides 3 to provide lateral restraint and to retain the material to be treated on the conveyor 1. The reaction surface 2a is, during operation, covered with a relatively thin layer of material M to be reacted.

Figures 1, 2:
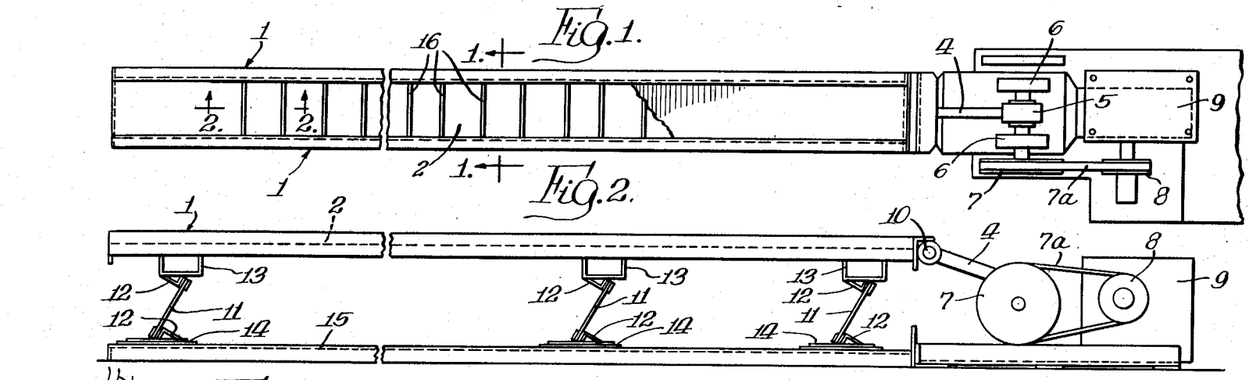
FIGURE 1 is a plan view of the conveyor and oscillating means therefor.
FIGURE 2 is a side elevation of the same.

Oscillatory motion is imparted to the conveyor 1 by means of a drive unit consisting of a connecting rod 4 and an eccentric 5 supported by bearings 6. The eccentric 5 which is adjustable as to throw is driven by a pulley 7 which in turn is driven by a pulley 8 by means of belts 7a. The pulley 8 is mounted on the shaft of an electric motor 9. The pulleys 7 and 8 are mutually adjustable as to their working diameter so that the rate of speed of the eccentric may be varied within desired limits. This type of drive for imparting oscillatory motion to the conveyor is given by way of illustration only. Alternatively, rotating cams, electric vibrators and the like may be employed. Mixing elements 16 are mounted on or at the bottom wall 2 above or as a part of the reaction surface 2a to promote plowing up and mixing of the material undergoing thermal modification. The form which these mixing elements 16 may take is disclosed more in detail below. These elements 16 are preferably approximately equally spaced along the length of the conveyor bottom, but their spacing may be varied. For the desired result, they should be spaced apart a certain minimum distance to permit the surface 2a of the conveyor to gain sufficient frictional hold as to be able to thrust the material up and over the mixing elements 16 under the influence of the impulses imparted to the conveyor 1. That minimum distance can only be determined by trial, but for starch derivatives of the type with which we are here dealing we find that the said minimum distance is about two to twelve times the width of the mixing elements, or about 5 to 30 times the height of the mixing elements. The chief factors influencing this spacing are the coefficient of friction of the material relative to the engaging surface, the height of the elements and their angularity of the advancing stream of material and the frequency, direction, and amplitude of oscillation of the conveyor.

Referring now to FIGURE 2, the conveyor 1 is supported preferably in horizontal position on flexible reactor legs 11 mounted rigidly at top and bottom on reactor leg brackets 12 having the required angle of the legs to give the desired motion to the conveyor when they are flexed by the oscillatory drive mechanism. In one embodiment of the invention, this angle is about 60° to the horizontal. The top reactor leg bracket 12 is attached to the conveyor 1 by means of the conveyor bracket 13 and the lower reactor leg bracket 12 is mounted on a mounting plate 14. The reactor leg assemblies are in turn mounted on an inverted channel 15 which serves as a base for the entire conveyor 1. This specific form of support is shown by way of illustration only.

The support or suspension for the conveyor 1 may consist of a rigid but pivoted linkage suspension, or a spring suspension or a combination of both. The conveyor can be supported in other ways as for example through use of torsion bars connected to the conveyor by means of suitable cranks and linkages, or by the use of coil springs mounted on supports parallel to the conveyor with the adjacent ends of the springs attached to the conveyor through suitable mounting brackets. Any desired form of oscillatory motion desired may be obtained by adaptation of the supporting means and cooperating reciprocating means.

The material M undergoing thermal modification is transported along the conveyor 1 by means of oscillatory motion imparted to the conveyor 1 at the pivot bearing 10 through the connecting rod 4 by the eccentric 5 (FIGURE 1). The direction of travel of the conveyor 1 is determined by the angle of the reactor legs 11 supporting the conveyor 1. For flexible reactor legs 11 mounted at an angle of 30° with the vertical, the direction of travel of the conveyor is at an angle of about 20° with the horizontal, the difference in angles being due to the flexible nature of the reactor legs 11. Accordingly, the conveyor moves in the vertical plane of the paper in FIGURE 2 about one-third of the distance that the conveyor moves horizontally in the same plane. The amplitude of travel in the horizontal direction is determined by the eccentricity of the eccentric, taking into account the vertical component compelled by the support. One may vary the speed of forward relative to back stroke and vice versa by a corresponding suspension or motion transformation means. The angularity of the links or struts 11 may be changed by shifting the position of the axis of the eccentric and thereby shift the ratio of vertical to horizontal component of motion of the conveyor. It is this oscillatory motion of the conveyor that results in transport of the material along the conveyor. The material is transported on the forward and upward stroke of the conveyor and the inertia of the transported materials resists the change in direction of the conveyor on its return and downward stroke. The rate of motion of the conveyor up and down preferably is great enough to separate the material from the surface of the conveyor at each stroke. The material is transported continuously by this non-uniform motion from the driven end of the conveyor at the right of FIGURES 1, 2 and 3 to the opposite end of the conveyor where it is discharged. Because of the upward component of the forward stroke, the transported material is suspended or levitated above the bed resulting in a layer of material having about twice the thickness of a static layer for a given weight of starch. In effect, the apparent bulk density of corn starch is reduced from 40 pounds per cubic foot for a static layer to 20 pounds per cubic foot for a layer of starch transported in this apparatus. Removal of moisture during thermal modification is aided because of the void spaces occurring in a layer of material transported in this apparatus. This fluffing or aeration reduces considerably the resistance to the moisture removal encountered in a static layer.

The rate of heat transfer is not adversely affected by the suspension of material in this apparatus because of the continuous mixing which occurs while the material is being transported. As pointed out previously, the thermal conductivity of the material absorbing heat is a limiting factor in rate of heat transfer in a static layer. The mixing which occurs in this apparatus continuously brings new material in pressure contact with the heat transfer surface, thereby minimizing the effect of low thermal conductivity of the material on rate of heat transfer.

The mixing elements 16, in addition to plowing up the material, serve the purpose of increasing retention time on the conveyor by retarding flow at the acclivity of the ridge and promoting mixing and blending to some degree across the width of the conveyor and to a marked extent across the depth of the layer.

Returning to FIGURES 1 and 2, the velocity at which material is transported on the conveyor is dependent upon the stroke of the eccentric 5, the angularity of the links or struts 11, the speed of rotation of the eccentric 5, and the design of the mixing elements 16. These variables should be adjusted so as to result in material velocities of 2 to 20 feet per minute, the preferred range being 2 to 18. The eccentric should be rotated at 425 to 710 revolutions per minute, the preferred range being 525 to 700 revolutions per minute. The eccentricity of the eccentric should be one-eighth to one-half inch, the preferred range being three-sixteenths to one-fourth inch.

During the thermal modification, the initial temperature of the reaction surface transporting the product should not exceed 230° C. (205° C. preferred) for starch containing 3% moisture nor 175° C. (165° C. preferred) for starch containing 12% moisture. Generally, a temperature of 95° C. is required for any reaction to take place in the thermal modification of polysaccharides. The layer of material transported in this apparatus should be about 2 to 18 millimeters thick, the preferred range being 4 to 15. The thickness of the layer for a given set of conditions should be confined within definite limits. This is governed by the feeding mechanism.

Figure 3:
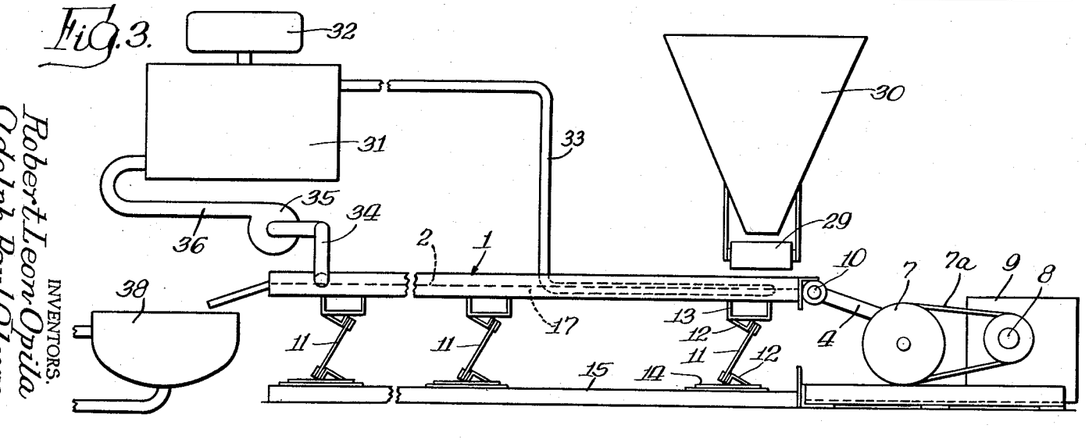
FIGURE 3 is a side elevation of the apparatus of FIGURES 1 and 2 connected to auxiliary equipment and set up for use.

FIGURE 3 shows diagrammatically a system embodying our invention applied to a continuous process for the thermal modification of carbohydrates. The material to be thermally modified is transferred from the supply hopper 30 to the conveyor 1 by means of a continuous gravimetric feeder 29. The conveyor 1 is supported by reactor legs 11 mounted on a base 15, and oscillating motion is imparted to the conveyor 1 at the pivot bearing 10 through the connecting rod 4 mounted on eccentric 5 (FIGURE 1). As described previously, the material is transported from the feed end, at the right of FIGURE 3, to the discharge end, at the left of FIGURE 3, of the conveyor by this oscillatory motion. At the discharge end of the conveyor, the thermally modified material, still at high temperature, is discharged into a cooling device, such as a jacketed blender 38 wherein cooling water is circulated through the jacket.

Figure 16:
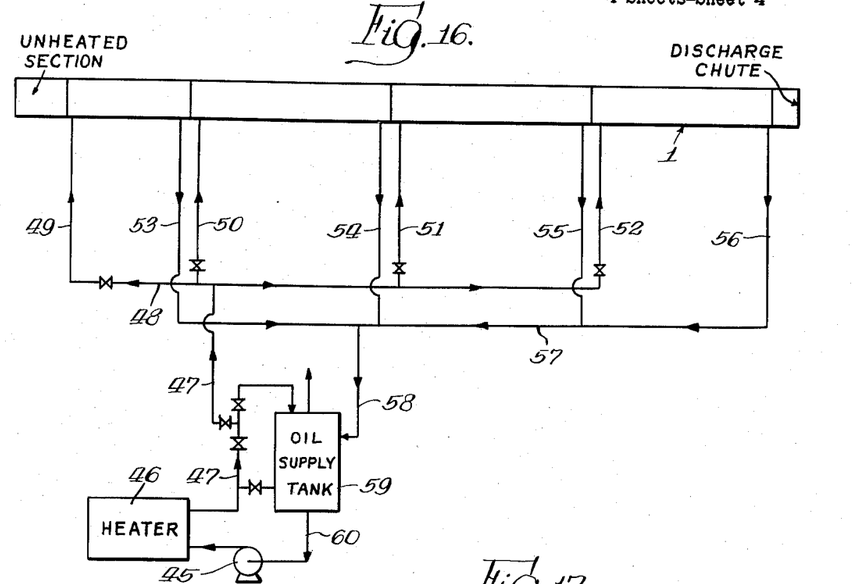
FIGURE 16 is a diagram of connections for the heating fluid flow in parallel for sections of the reactor.
Figure 17:
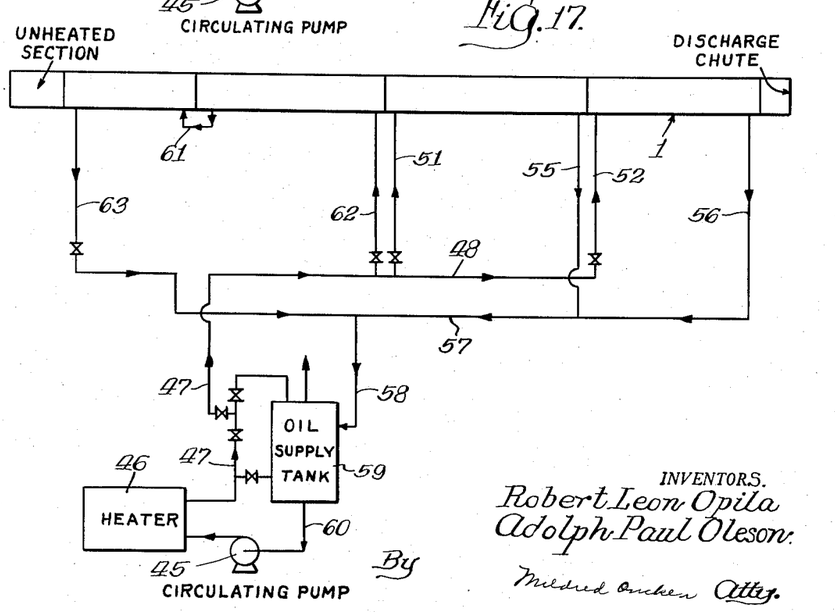
FIGURE 17 is a similar diagram of connections for mixed flow of treatment in the sections of the reactor.

The heat required to effect the thermal modification is supplied to a jacket 17 affixed to the bottom of the conveyor 1 in the form of a liquid or vapor heatant receiving space. The liquid is heated or vaporized in a boiler 31 equipped with an expansion tank 32 when the heatant remains liquid throughout the operation. The heatant is supplied to the jacket 17 through a pipeline 33. The jacket is zoned, as shown in FIGURES 16 and 17, to permit use of different heatant temperatures depending upon the moisture content of the starch. Because of the oscillations of conveyor 1, it is essential that a flexible connection be included in the pipe line 33 at the point where the pipe line enters the jacket 17 of the conveyor 1. The liquid or condensed vapor, as the case may be, is removed from the jacket through a pipe line 34 equipped with a flexible connection by means of a pump 35 which returns the liquid through pipe line 36 to the boiler 31.

The above described modes of heating the conveyor 1 are given as illustrations only, and in no way limit the manner in which heat may be supplied to the polysaccharides undergoing thermal modification in accordance with the present invention.

Figure 4:
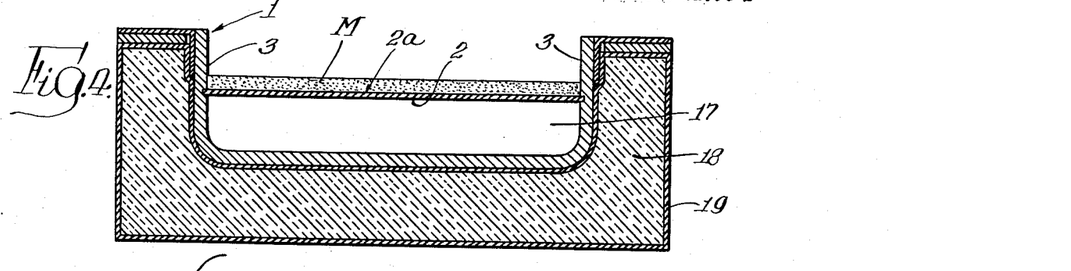
FIGURE 4 is a vertical cross sectional view taken on line 1—1 of FIGURE 1, showing one form of apparatus for promoting a high rate of heat absorption by the material undergoing thermal modification from a liquid or vapor heatant.

FIGURE 4 shows a vertical cross sectional view, as on line 1—1 of FIGURE 1, of one form of the apparatus wherein a liquid or vapor heatant is used to supply the heat required to effect the thermal modification. The conveyor 1 is equipped with a heat conductive wall 2 having a reaction surface 2a which wall is installed in such manner as to utilize sides 3 for retaining the material on the reaction surface 2a. The enclosed jacket space 17 contains the liquid or vapor heatant. In order to minimize heat losses, the bottom and sides of the conveyor 1 are covered with a thermal insulating material 18 of any preferred form. The insulating material is surrounded by a metal sheath or enclosure 19 which retains the insulating material in place.

Figure 5:
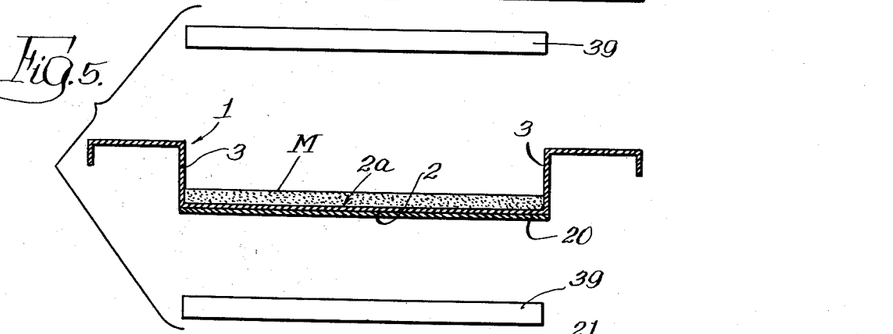
FIGURE 5 is a vertical cross sectional view similar to FIGURE 4, showing a modified form of apparatus for promoting a high rate of heat absorption by the material undergoing thermal modification from infrared generators mounted above and below the reaction surface of the apparatus.

FIGURE 5 shows a vertical cross-sectional view, similar to that of FIGURE 4, of a modified form of apparatus where infrared generators 39 mounted above and/or below the reaction surface are used to supply the heat required to effect the thermal modification chiefly by radiation. The conveyor 1 consists simply of a bottom wall 2 providing a reaction surface 2a and sides 3 to retain the material on the conveyor 1. The bottom wall may be provided with a layer 20 of heat distributing metal, such as copper, where the heating medium is not uniform over the area of the reaction surface.

Figure 6:
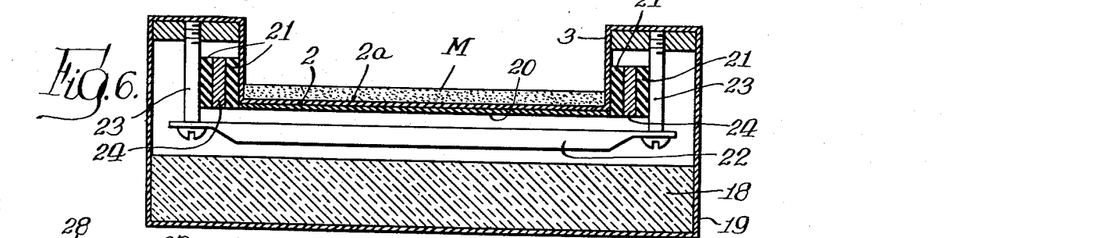
FIGURE 6 is a vertical cross sectional view, similar to FIGURE 4, showing another modified form of apparatus for promoting a high rate of heat absorption by the material undergoing thermal modification from electrical resistance elements mounted below the reaction surface.

FIGURE 6 shows a vertical cross sectional view, similar to that of FIGURE 4, of another modified form of apparatus where electrical resistance elements 22 are used to supply the heat required to effect the thermal modification. The electrical resistance elements 22 are secured to the conveyor 1 by fasteners 23, and the lower side of the wall 2 of the reaction surface 2 exposed to the electrical resistance elements 22 is clad with a layer 20 of copper to insure uniform heat distribution. Electrical energy is supplied to the elements 22 by bus bars 24 which are electrically insulated by insulation 21 from the retaining sides 3 and fasteners 23. The lower sides of the elements 22 are thermally insulated by insulation 18 to minimize heat losses. The thermal insulation 18 is supported by a metallic enclosure 19. The temperature of the reaction surface 2a is controlled by the voltage impressed on the elements 22.

Figure 7:
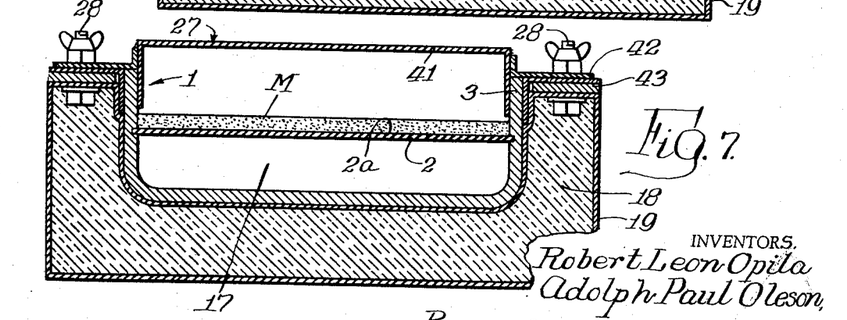
FIGURE 7 is a vertical cross sectional view similar to FIGURE 4 of a modified form of apparatus for reducing the rate of mass transfer from the material to the vapor carrier by a covertype device.

Referring now to FIGURE 7, a vertical cross sectional view similar to FIGURE 4 of the cover type device 27, which reduces the rate of mass transfer of vapors from the material to the vapor carrier. The cover type device, which consists of an inverted channel 41 with side flanges 42, are secured to the top of the conveyor 1 by means of suitable fasteners 28 mounted on brackets of flanges 43 affixed to the retaining sides 3. The tight fitting cover-type device impedes the natural convection currents of the vapor carrier, thereby allowing the water vapor in the atmosphere between the cover-type devices 27 and the material on the reaction surface 2 to come to an equilibrium with the moisture in the material. The amount of water vapor that can be removed from the material is dependent upon the moisture content of the vapor carrier. The extreme case is when the vapor carrier is saturated, whereupon no moisture can be removed from the material undergoing thermal modification. This condition can be assured by adding a controlled amount of slightly superheated steam to the atmosphere under the cover type device 27. Less stringent conditions can be attained by varying the length of the cover type devices 27 mounted on the conveyor 1, or the freedom of escape of the vapor from thereunder. The ends of the cover type device may be open to atmosphere or restricted at either end.

Condensation of water vapor from the vapor carrier upon the cover type devices 27 is prevented by heat conducted from the liquid or vapor jacket 17 through the retaining sides 3 to the tight fitting cover type devices 27. The liquid or vapor jacket is here disclosed for purposes of illustration only, and is in no way limiting, since heat will be conducted through the retaining sides 3 in the same way, whether the heat required for modification is supplied by infrared generators mounted below the conveyor or by electrical resistance elements. Use of infrared generators mounted above the conveyor to supply the heat required for modification is not preferred in this embodiment, since the cover-type devices will interfere with the absorption of infrared energy by the material undergoing modification.

Figure 8:
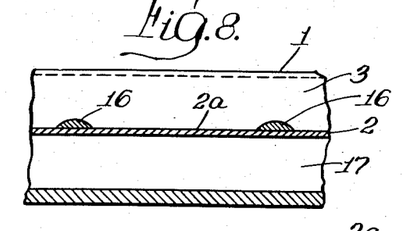
FIGURE 8 is a fragmentary vertical longitudinal section taken on line 2—2 of FIGURE 1, showing the mixing elements in cross section.

FIGURE 8 shows a vertical cross sectional view, on line 2—2 of FIGURE 1, of the mixing elements 16 used to plow up and to promote mixing of the material and to insure uniformity of the product when the material is absorbing heat from a source of heat whether it be a radiant or liquid or vapor heatant. The mixing elements 16 are secured to the top surface of wall 2 providing the reaction surface 2a at regular intervals, with the range of spacing being from 2½ inches to 12 inches between centers of the elements, 3½ inches to 5 inches being the preferred range. The wall 2 for the reaction surface 2a is mounted, as previously described, in the conveyor 1 to form the top wall of the vapor or liquid heating jacket 17. It is imperative that mixing elements be used in this apparatus to promote mixing and equalization across the width of the conveyor as well as across the thickness of the thin layer, i.e., through the depth thereof. An important attribute of these mixing elements is that their use does not raise any appreciable amount of dust.

Figure 9:
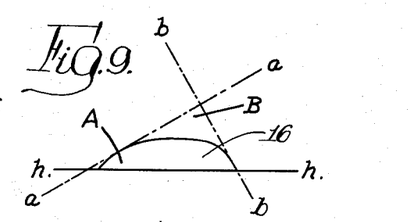
FIGURE 9 is a cross sectional view on an enlarged scale of one of the mixing elements.

FIGURE 9 shows, in cross section, and on an enlarged scale, the element 16 that promotes mixing and does so without resulting in dusting of the material undergoing thermal modification. The construction of mixing element shown in FIGURES 8 and 9 is preferred where liquid or vapor heatants supply the heat required for modification. This specific form of mixing element is shown by way of illustration only, and is in no way limiting as to the configuration, "pickup" or acclivity angle or "break" angle of the mixing element. The "pickup" angle is defined here as the angle A formed by the horizontal h—h and the line a—a tangent to the steepest slope of the leading or "pickup" or acclivity edge of the mixing element. The "break" angle is defined here as the angle B formed by the tangent lines a—a and b—b to the steepest slopes of the leading or "pickup" edge and the trailing or discharge edge of the mixing element. The range of the "pickup" angle is 7° to 50°, the preferred angle being between 12° and 25°. The range of the "break angle" is 75° to 130°; the preferred angle being between 95° and 130°.

Figures 10, 11:
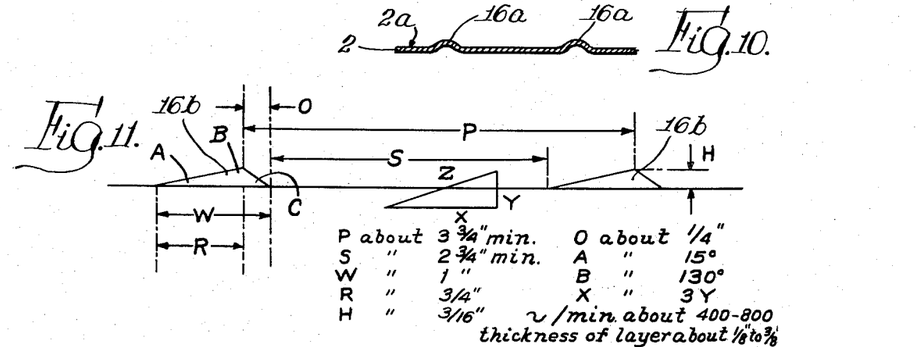
FIGURE 10 is a detailed longitudinal sectional view similar to FIGURE 8 of the form of mixing elements used where the mixing elements are integral parts of the bottom wall which provides the reaction surface.
FIGURE 11 is a longitudinal sectional view similar to FIGURE 8 of a conveyor or channel bottom showing a modified form of the mixing elements with dimensions indicated thereon.

FIGURE 10 shows a useful way of installing the mixing elements 16a wherein the elements 16a are formed into the wall 2 of the reaction surface 2a, thereby becoming an integral part of the said wall. This design is especially useful where the required heat of modification is supplied by electrical resistance elements or by infrared generators.

In FIGURE 11, we have shown a form of mixing element which has been successfully used. In this embodiment, the pitch of the elements 16b—16b is about 3¾" as a minimum, and may range upwardly. The height of the element is $\frac{3}{16}$", and the width of the base one inch with the acclivity or entrance angle A of about 15°. The break angle B is about 130° and the declivity angle C is about 35°. With a width of the element of approximately one inch, the rise part R is about ¾" and the declivity extends horizontally about ¼". With the struts 11 disposed at approximately 60° to the horizontal and the eccentric operating between 400 and 800 cycles per minute, and with a thickness of the layer of material between ⅛" and ⅜" a very satisfactory operation is obtained. The relation of the vertical component Y of reciprocating motion to the horizontal component X is approximately 1 to 3. This is indicated on the triangle XYZ at the central part of FIGURE 11.

Figure 12:
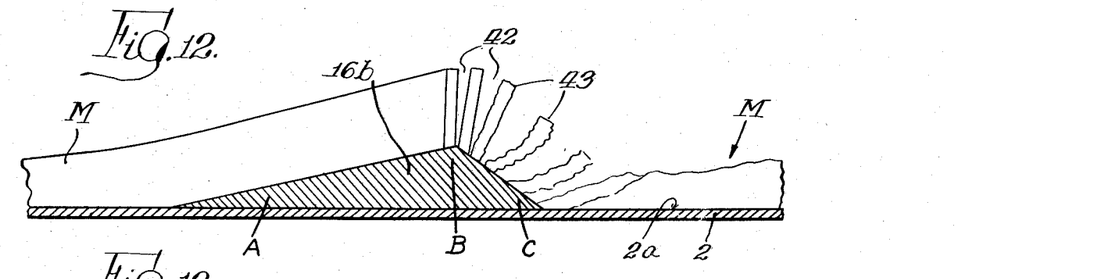
FIGURE 12 is a diagrammatic illustration of the plowing action which takes place at each of the mixing elements.
Figures 13, 14:
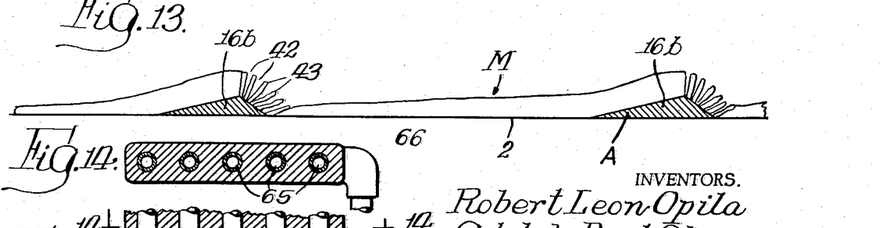
FIGURE 13 is a diagrammatic illustration of the stretching, compressing, breaking and dropping of the material of the bed by the action of the mixing elements.
FIGURE 14 is a cross sectional view.

The operation of this embodiment is illustrated in FIGURES 12 and 13. The travel of the material M in FIGURES 12 and 13 is from the left to the right, and for purposes of analysis, it may be assumed that the layer of material M is in a state of flow, being agitated and levitated by a vertical component of motion of the conveyor, and propelled horizontally by the horizontal component X of motion indicated on the triangle XYZ at the center of the diagram of FIGURE 11. That is to say, the motion of the conveyor wall and elements 16b is along the line Z which imparts to the material M the vertical component of motion Y and the horizontal component of motion X. The conveyor moves at all times parallel to its static position. This is preferably horizontal but not necessarily so. It may be inclined within limits either way.

As the material M travels towards the right, it encounters the resistance to flow presented by the mixing elements 16b. Since the material is in a highly fluid condition, it will tend to equalize transversely upon meeting the resistance to longitudinal flow afforded by the mixing elements 16b, and if the surface 2a is level transversely, the layer of material will equalize its thickness across a transverse section. The material is moved by means of friction of the wall 2a with the material and the material tends to maintain its motion by inertia. As the material flows upwardly on the acclivity of the mixing element 16b, it tends to form a thicker layer because its progress is less easily accomplished. At it rises over and beyond the break angle B, it breaks up, by the formation of transverse fissures 42 which separate slices or slabs 43 which spall off of the oncoming face of the body of material advancing over the break angle. These slices or slabs 43 tend to crumble and move down the declivity of the mixing element by the force of gravity, being also propelled by the forward component of the vibratory motion. Thereby, the falling and crumbling of the bodies 43 down toward the supporting surface 2a creates a velocity of flow at this point which is above the average rate of flow. The flow of the material up the acclivity of the mixing element 16b is below the average rate of flow. The material is thus stretched apart at one point, and is pushed together at another point by differences in the rate of flow and the configuration of the surface on which it travels. The result is a raising, a breaking up of the mass and a dropping of the fragments in an operation which may well be described as a plowing operation. The breaking up or fragmentation approximates the manner illustrated in the drawings although the actual movement of the broken up material and the particles is difficult to portray.

The distribution of heat along the length of the conveyor may be selectively controlled by regulating the heat input. For example, in the forms of embodiment illustrated in FIGURES 5 and 6, the voltage impressed upon the heater elements controls the heat output. The distribution of temperature and heat flow throughout the various sections may be controlled by controlling the voltage applied to the individual heater elements. By dividing the jacket space 17 for fluid heatant into separate sections longitudinally, and regulating the heat input into the respective sections, any desired heating pattern along the length of the conveyor may be obtained. Thus assume in the diagrams of FIGURE 16 that the jacket portion of the conveyor 1 is divided up into an unheated heater section at the feeder end and an unheated discharge chute at the discharge end, and that the portion is between is divided into four sections with parallel flow of heatant to each of the sections and parallel return flow to the heater. By regulating the rate of flow of heat through a particular section, its heat output may be regulated even though the temperature of heatant supplied to each of the sections is the same. Thus, for example, in FIGURE 16, the first section is shorter than the succeeding sections, and may therefore have a higher heat flow than the subsequent sections for the same rate of heatant delivery.

In FIGURE 17, the first two sections are put in series, with the heatant at its maximum temperature being delivered to the central part of the conveyor 1, so that there is a temperature rise from the beginning of flow on the conveyor to about the central part of the conveyor, and then the heat flow to the third and fourth sections may be substantially the same.

In FIGURE 16 the pump 45 delivers the return heatant to the heater 46, and the delivery line 47 connects to the manifold 48 having delivery branches 49, 50, 51 and 52 to the respective four sections.

The return connections 53, 54, 55 and 56 communicate with return manifold 57, which returns the heating oil or other fluid through the pipe 58 to the supply tank 59 and in turn, by connection 60, to the pump 45. By suitable valves interposed particularly in the delivery connections to the separate sections, the rate of flow may be controlled and the heat output in the various sections thereby regulated.

In FIGURE 17, the first two sections are connected together in series by connection 61, and supplied with heatant at high temperature from the manifold 48 through the pipe 62 at the central part, that is, the rear part of the second section, so that the heatant, as it gradually loses its temperature, provides a graduated heating from the central part to the front end of the conveyor 1. The colder returning oil or other fluid heatant flows through the return pipe 63 to the manifold 57 and through oil supply tank back to the circulating pump 45. Various valves and pressure and temperature indicators may be provided in suitable locations in these piping systems.

Figure 15:
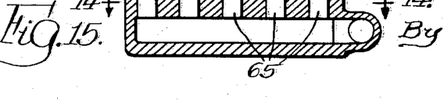
FIGURE 15 is a horizontal view of a modified form of heating element.

In FIGURES 14 and 15, we have indicated another manner of heating the bottom wall 2 of the conveyor so as to supply heat to the effective heating surface 2a. In this case, a series of pipes 65 are embedded in a block 66 of copper or other highly conductive metal, which may be spaced from wall 2 with sufficient clearance to allow of motion of the conveyor wall 2 relative thereto, but the said conveyor wall 2 will receive its heat by radiation from the heatant through the pipe 65 and the equalizing mass of metal 66.

Analytical procedures and methods for comparison will now be described before descriptions of the specific examples are given.

The following methods of analyses apply to the pyrodextrins:

Moisture content was determined by the Karl Fischer method described in Ind. Eng. Chem., Anal. Ed. 17, 312 (1945).

Reducing sugar, calculated as dextrose, was determined in essentially the same manner as that described by Zerban and Browne in NBS Circular 440.

The cold water solubility was determined on a solution of the dextrin containing 1 percent dry substance. The solution was gently agitated while submerged for one hour in water at 25° C. The solution was immediately filtered through Whatman No. 12 paper, and the dry substance in the filtrate was determined by evaporation followed by drying in a vacuum oven for one hour at 100° C. Solubility is that fraction of the original material present in the filtrate.

Fluidities of dextrins were determined on pastes prepared at the appropriate concentration by heating the mixture for 30 minutes in a steam bath. The cooked paste was cooled for 30 minutes in a bath at 25° C., water was added to compensate for evaporation losses, and the paste was returned to the bath for another 30 minutes. The paste was strained into a standardized fluidity funnel and the volume discharged in 70 seconds was recorded as the fluidity. The retrogradative tendency of a dextrin was determined on a paste of the appropriate solids concentration, prepared in the same manner as the fluidity paste. The viscosity of the paste, stored in a 25° C. constant temperature bath, was determined at various times with a Brookfield viscosimeter. This instrument has been described by Kerr, "Chemistry and Industry of Starch," 2nd edition, Academic Press Inc., New York (1950), p. 127.

Scott viscosity values of dextrins were determined on hot pastes essentially as described by Kerr, ibid., pp. 119–121.

Clarities of dextrin pastes were determined on pastes at the various solids concentrations cooked for 30 minutes in a boiling water bath with continuous agitation. The solutions were cooled slowly to room temperature, water was added to compensate for evaporation, and the solutions were aged for 20 hours in a 30° C. water bath. Light transmission through a 10 mm. cell was determined at 650μ in the Coleman Model 14 spectrophotometer.

The catalyst concentration was determined by titrating 20-gram samples of the unacidified and acidified starches in 150 ml. of water to pH 6.0 with 0.05 N NaOH, and from calculating the concentration of acid from the difference in titers.

The following methods of analyses apply to the modified carbohydrate materials produced from dried starch conversion syrups:

Moisture contents were determined by drying the materials in a vacuum oven for 4 hours at 100° C.

The pH of the material was determined in a solution of the material containing 20 grams of dry substance in 150 ml. of water. Acid concentrations were determined in a manner identical to that used by pyrodextrins.

Solubility in cold water was determined in a manner identical to that used for pyrodextrins.

The viscosity of solutions of the product was determined by heating a solution of the proper concentration in a steam bath for 15 minutes, cooling the solution to 25° C., adding water to compensate for evaporation losses, followed by storage for 1 hour at 25° C. The viscosity of th esolution was determined with a Brookfield viscosimeter.

The color of the solution used in the viscosity determination was determined using a Hellige Varnish Comparator No. 620C–40, the color system established by the Institute of Paint and Varnish Research. Formaldehyde was determined essentially as described by Walker, "Formaldehyde," 2nd edition, Reinhold Publishing Company, New York (1953), pp. 382–384.

The following methods of analyses apply to the orthophosphate esters of starch:

Moisture contents were determined by drying the materials in a vacuum oven for 4 hours at 120° C.

Phosphorus was determined by an adaptation of the method described by Howk and De Turk, Ind. Eng. Chem., Anal. Ed. 4, 111 (1932). All products were extensively washed either in aqueous alcohol, or in the case of water insoluble product, in distilled water prior to analysis.

Scott viscosity values were determined on hot pastes at pH 6.5 essentially as described by Kerr, ibid., pp. 119 to 121. Because of the relatively high viscosity of some of the phosphate esters made from otherwise unmodified starch, a concentration of 3 or 5 grams, dry basis, in 280 ml. of water was used and the viscosity was reported as seconds of delivery of 50 ml. of the paste.

Clarity of Scott pastes was determined by cooling the paste to 25° C. for an hour and measuring the percent light transmission through a 13 mm. cell at 650μ in the Coleman Model No. 14 spectrophotometer.

The following are examples of the application of the invention to practice. These specific examples are to be regarded as merely informative and typical, and not as limiting the invention in any way. The vibrating conveyor equipped with mixing elements employed in the following examples was 40 feet long, with the first three feet unheated.

EXAMPLE 1

Anhydrous hydrogen chloride gas was blended into powdered corn (maize) starch, containing 10.0% moisture as is, resulting in a final concentration of 28.3 grams of anhydrous hydrogen chloride per 100 pounds of starch dry substance. The acidified starch was then transferred to a storage hopper supplying a continuous gravimetric feeder. The acidified starch was fed into a vibrating conveyor equipped with mixing elements at a rate of 220 pounds per hour per foot of conveyor width. The conveyor was heated by Aroclor 1248 heat transfer medium (manufactured by Monsanto Chemical Company), contained in four jackets under the reaction surface, at a temperature of 196° C., resulting in a maximum product temperature of 182° C. The one-fourth inch eccentric was driven at 600 r.p.m., resulting in a material travel of 5.4 feet per minute and a retention time of 6.9 minutes. Samples of the material undergoing thermal modification were obtained at various distances along the conveyor to determine the properties of the material. Pertinent data are given in Table I.

*Table I*

| Distance Traveled, ft. | Time required to travel the distance (min.) | Temp. of Material, ° C. | Moisture Content, percent as is | Reducing Sugar, as Dextrose, percent D.B. | Cold Water Solubles, percent D.B. |
|---|---|---|---|---|---|
| 0 | | 27 | 10.0 | 0.01 | 0.0 |
| 7 | 1.7 | 100 | 9.7 | 0.55 | 5.0 |
| 17 | 3.6 | 144 | 5.4 | 2.55 | 22.3 |
| 27 | 5.4 | 150 | 3.0 | 3.5 | 45.5 |
| 37 | 6.9 | 151 | 1.0 | 3.3 | 91.2 |

The product was quickly cooled in a pneumatic cooler. The resulting high solubles white dextrin was compared with a commercially available white dextrin here designated as "A" of comparable solubility and fluidity which had been manufactured in air-swept cookers. The white dextrin prepared in our apparatus was significantly lighter, or whiter, than the commercial dextrin. The dextrins were compared further on the basis of paste fluidities and retrogradative tendencies, and were judged to be identical as shown in Table II.

*Table II*

| | 3/4 Paste Fluidity, ml./70 sec. | Retrogradative Tendency, Brookfield Viscosity (cp.) of Paste at Concentrations Indicated | | | |
|---|---|---|---|---|---|
| | | 42.8% Dry Substance | | 50% Dry Substance | |
| | | 2 Hours at 25° C. | 24 Hours at 25° C. | 2 Hours at 25° C. | 24 Hours at 25° C. |
| Continuously Prepared Dextrin | 16.0 | 180 | 210 | 700 | 750 |
| Commercial Dextrin "A" | 15.5 | 190 | 210 | 700 | 760 |

EXAMPLE 2

The same procedure was used as in Example 1, except corn (maize) starch containing 8.9% moisture as is and 32.0 grams anhydrous hydrogen chloride per 100 pounds of dry substance was supplied to the conveyor at the rate of 300 pounds per hour per foot of conveyor width. The ¼-inch eccentric was driven at 650 r.p.m. resulting in a retention time of 2.6 minutes. Aroclor 1248 heat transfer medium was supplied to the jackets at 138° C., resulting in a maximum product temperature of about 127° C. As shown in Table III cooled white dextrin was compared with a commercially available dextrin, designated here as "B," having comparable solubility and fluidity manufactured in air-swept cookers.

*Table III*

| | Solubles, percent D.B. | 1/2 Paste Fluidity, ml./70 sec. | Retrogradative Tendency, Brookfield Viscosity (cp.) of Paste at Concentration of 33.3% Dry Substance | | | |
|---|---|---|---|---|---|---|
| | | | 1 Hour at 25° C. | 2 Hours at 25° C. | 4 Hours at 25° C. | 24 Hours at 25° C. |
| Continuously Prepared Dextrin | 16.0 | 17.0 | 170 | 450 | 910 | 4,700 |
| Commercial Dextrin "B" | 15.0 | 13.0 | 510 | 3,800 | 8,500 | gel |

The dextrin prepared in our apparatus was far superior with respect to retrogradative tendency than the comparable white dextrin prepared in air-swept cookers.

EXAMPLE 3

The same procedure was used as in Example 1, except starch containing 9.6% moisture as is and 19.3 grams of anhydrous hydrogen chloride gas, was supplied to the conveyor at a rate of 225 pounds per hour per foot of conveyor width. The ¼-inch eccentric was driven at 700 r.p.m. resulting in a retention time of 2.1 minutes. Aroclor 1248 heat transfer medium was supplied to the jackets at 105° C., resulting in a maximum product temperature of 95° C. As shown in Table IV, the cooled white dextrin was compared with a commercially available dextrin designated as "C" having comparable solubility and fluidity which had been manufactured in a vacuum cooker.

*Table IV*

| | Solubles, percent D.B. | 1/12 Paste Fluidity, ml./70 sec. | Retrogradative Tendency, Brookfield Viscosity (cp.) of Paste at Concentration of 7.7% Dry Substance | |
|---|---|---|---|---|
| | | | 2 Hours at 25° C. | 24 Hours at 25° C. |
| Continuously Prepared Dextrin | 1.5 | 29.0 | 1,100 | 2,400 |
| Commercial Dextrin "C" | 1.0 | 13.0 | 1,800 | 3,400 |

The dextrin prepared in our apparatus was superior with respect to retrogradative tendency than the comparable white dextrin prepared in vacuum cookers.

EXAMPLE 4

The same method was used as in Example 1, except unacidified starch containing 10.0 percent moisture, as is, was supplied to the conveyor at the rate of 150 pounds per hour per foot of conveyor width. The ¼-inch eccentric was driven at 550 r.p.m. resulting in a retention time of 11.5 minutes. Aroclor 1248 heat transfer medium was supplied to the jackets at 209° C. resulting in a maximum product temperature of 196° C. As shown in Table V, the cooled British gum was compared with a commercially available British gum designated as "D," having comparable solubility and fluidity which had been manufactured in an air-swept cooker.

Table V

| | Solubles, percent D.B. | 17 g. Scott, sec./100 ml. | Retrogradative Tendency, Brookfield Viscosity (cp.) of Paste at Concentration of 6% Dry Substance | |
|---|---|---|---|---|
| | | | 2 Hours at 25° C. | 24 Hours at 25° C. |
| Continuously Prepared British Gum | 1.1 | 54 | 1,200 | 1,700 |
| Commercial British Gum "D" | 2.0 | 60 | 1,200 | 1,800 |

The British gum prepared in our apparatus is substantially identical to the commercially available British gum indicating the flexibility of our invention.

EXAMPLE 5

The same procedure was used as in Example 1, except powdered corn (maize) starch containing 4.7 percent moisture as is and 28.4 grams of anhydrous hydrogen chloride per 100 pounds of dry substance was supplied to the conveyor at a rate of 180 pounds per hour per foot of conveyor width. The ¼-inch eccentric was driven at 575 r.p.m. resulting in a retention time of 5.4 minutes. The material was heated by electrical infrared generators mounted above the reaction surface, producing a maximum product temperature of 163° C. The properties of the cooled canary dextrin are given in Table VI.

Table VI

Moisture, percent as is ______________________ 1.01
Reducing sugar, as dextrose, percent D.B ______ 1.50
Solubles, percent D.B ________________________ 100.0

EXAMPLE 6

Three batches of powdered corn (maize) starch were used to prepare canary dextrins under conditions shown hereinafter. Anyhydrous hydrogen chloride was added to the batches resulting in the concentrations shown in Table VII.

Table VII

| Starch Batch No. | A | B | C |
|---|---|---|---|
| Moisture Content, percent as is | 9.4 | 8.3 | 8.2 |
| HCl Concentration, g./100 lb. D.S. | 30.4 | 29.0 | 29.0 |

In all cases, the acidified starch was supplied to the heated conveyor at a rate of 150 pounds per hour per foot of conveyor width. The ¼-inch eccentric was driven at 650 r.p.m. resulting in retention times of 8 to 8¼ minutes. Aroclor 1248 heat transfer medium was supplied to the jackets at 193 C. Acidified starch batches A and a portion of acidified starch batch B were dextrinized using an open trough promoting the maximum rate of moisture removal while another portion of acidified starch batch B and acidified starch batch C were dextrinized with the initial 18.7 feet of the conveyor enclosed by tight fitting covers thereby reducing the rate of moisture removal. The resulting four dextrins are compared in Table VIII.

Table VIII

| Starch Batch No. | Open Trough A | Open Trough B | Cover Trough B | Cover Trough C |
|---|---|---|---|---|
| Length of Covers | | | 18.7 | 18.7 |
| Reducing Sugar, as dextrose, percent D.B. | 3.1 | 2.5 | 3.9 | 3.3 |
| Solubles, percent D.B. | 100.00 | 99.4 | 99.9 | 100.0 |
| 1/1 Fluidity, ml./70 sec. | 4.2 | 3.3 | 6.0 | 5.9 |

The effect of starch variation is minimized through use of acid concentrations of about 30 grams of hydrogen chloride per 100 pounds of starch dry substance, based on the above results. The use of covers to reduce rate of moisture removal increases the extent of hydrolysis resulting in dextrins having a higher fluidity than can be produced without the use of these enclosures.

The cooled dextrin prepared from acidified starch batch B using tight fitting covers in the conveyor was compared with a commercially available dextrin designated as "E" having comparable solubility and fluidity which had been manufactured in an air-swept cooker. The dextrin prepared continuously was lighter in color than any known canary dextrin manufactured from corn starch. The dextrins were compared further on the bases of fluidities and retrogradative tendencies as shown in Table IX.

Table IX

| | 1/1 Paste Fluidity, ml./70 sec. | Retrogradative Tendency, Brookfield Viscosity (cp.) of Paste at Concentrations Indicated | | | |
|---|---|---|---|---|---|
| | | 50% Dry Substance | | 60% Dry Substance | |
| | | 2 Hours at 25° C. | 24 Hours at 25° C. | 2 Hours at 25° C. | 24 Hours at 25° C. |
| Continuously Prepared Dextrin | 6.0 | 430 | 480 | 4,900 | 5,000 |
| Commercial Dextrin "E" | 8.0 | 380 | 430 | 4,700 | 4,900 |

Although the continuously prepared dextrin was slightly more viscous than the conventionally prepared dextrin, the retrogradative tendency of this dextrin was slightly superior to that of dextrin "E."

EXAMPLE 7

This example shows the ease with which we can match the dextrins prepared under ideal conditions (which are of course, uneconomical) in a batch cooker.

Anyhydrous hydrogen chloride gas was blended into powdered potato starch, containing 15.4 percent moisture as is, resulting in a final concentration of 38 grams of anhydrous hydrogen chloride per 100 pounds of starch dry substance. The acidified potato starch was supplied to the heated conveyor at a rate of 188 pounds per hour per foot of conveyor width. Aroclor 1248 heat transfer medium was supplied to the conveyor at a temperature of 216° C. The ¼-inch eccentric was driven at 550 r.p.m., resulting in a retention time of 9.3 minutes. The cooled dextrin prepared continuously was compared with a dextrin carefully prepared in a batch vacuum cooker from the same batch of potato starch. The dextrin produced batchwise was prepared as follows:

The potato starch was transferred into the vacuum cooker, both maintained at room temperature, and the cooker was sealed. Sufficient anhydrous hydrogen chloride was added into the cooker to result in an acid concentration of 30 grams per 100 pounds of starch dry substance. The Aroclor 1248 heat transfer medium was slowly heated to a temperature of 149° C. in 2 hours, resulting in a maximum temperature difference between heatant and material of 17° C. The temperature of the heatant was maintained at 149° C. for an additional 7 hours, resulting in a maximum product temperature of 138° C. The dextrin was slowly cooled to 49° C. in 45 minutes. The two cooled dextrins, having solubility in cold water of 99 percent, were compared on the basis of paste clarity at different concentrations as shown in Table X.

*Table X*

| Paste Concentration, Percent Dry Substance | Percent Light Transmission Through Paste of— | |
|---|---|---|
| | Continuously Prepared Dextrin | Dextrin Prepared Batchwise |
| 5 | 97 | 97 |
| 10 | 93 | 93 |
| 20 | 86 | 86 |
| 30 | 78 | 78 |
| 40 | 64 | 56 |
| 45 | 25 | 27 |
| 50 | 11 | 19 |

The slowly converted product is closely matched in clarity by the rapidly converted product, indicating that dextrins prepared in our apparatus are as uniform as dextrins prepared carefully in batch cookers.

EXAMPLE 8

Anhydrous hydrogen chloride gas was blended into a spray-dried corn (maize) starch conversion sirup solids, containing 2.4 percent moisture as is, resulting in a final concentration of 41.8 grams of hydrogen chloride gas per 100 pounds of sirup solids dry substance. The reducing sugar content, calculated as dextrose, of the sirup solids was 11.8 percent, dry basis. The acidified sirup solids were continuously supplied to the heated conveyor, equipped with mixing elements, at a rate of 168 pounds per hour per foot of conveyor width. Aroclor 1248 heat transfer medium was supplied to the jackets at a temperature of 220° C., resulting in a maximum product temperature of 207° C. The ¼-inch eccentric was rotated at 575 r.p.m., resulting in a retention time of 4½ minutes. The cooled product had a light tan-yellow color and a reducing sugar content calculated as dextrose of 4.7 percent. A solution of this product containing 67 percent dry substance had a Brookfield viscosity of 290 poises, measured at 25° C. and a Hellige solution color of 10 units.

EXAMPLE 9

A batch of spray-dried corn (maize) starch conversion sirup solids containing formaldehyde was acidified with anhydrous hydrogen chloride to a concentration of 42.6 grams per 100 pounds of sirup solids dry substance. The acidified solids had the properties shown in Table XI.

*Table XI*

| | |
|---|---|
| Moisture, percent as is | 3.8 |
| Reducing sugar, as dextrose, percent D.B | 12.3 |
| Formaldehyde, percent D.B | 0.66 |
| pH (11.8% D.S. solution) | 2.58 |
| Solubles, percent D.B | 100.0 |
| Hellige color of 30% solution, units | Less than 1 |
| Brookfield viscosity of 30% D.S. solution, poises at 25° C | 0.3 |

The acidified sirup solids were continuously supplied to the heated conveyor equipped with mixing elements at a rate of 150 pounds per hour per foot of conveyor width. Aroclor 1248 heat transfer medium was supplied to the conveyor at a temperature of 227° C., resulting in a maximum product temperature of 213° C. The ¼-inch eccentric was rotated at a speed of 700 r.p.m. resulting in a retention time of 3 minutes 31 seconds. The cooled light yellow-tan product has the properties shown in Table XII.

*Table XII*

| | |
|---|---|
| Moisture, percent as is | 0.7 |
| Reducing sugar, as dextrose, percent D.B | 5.4 |
| pH (11.8% D.S. solution) | 3.79 |
| Solubles, percent D.B | 68.0 |
| Hellige color of 30% D.S. solution, units | 5.3 |
| Brookfield viscosity of 30% D.S. solution, poises at 25° C | 405 |

EXAMPLE 10

1000 parts of corn (maize) starch, containing 6.5 percent moisture as is and 19.1 parts of sodium tripolyphosphate, as indicated by phosphorus analysis, was supplied continuously to the vibrating conveyor equipped with mixing elements at a rate of 200 pounds per hour per foot of conveyor width. The ¼-inch eccentric was operated at 610 r.p.m., resulting in a retention time in the conveyor of 4.0 minutes. The material was heated by electrical infrared generators mounted above the reaction surface, producing a maximum product temperature of 154° C. The cooled simple orthophosphate ester of starch was washed to remove unreacted salts and the properties of the purified product are given in Table XIII.

*Table XIII*

| | |
|---|---|
| Moisture content of cooled product, percent as is | 2.0 |
| 5-gram Scott of purified product, sec./50 ml | 49 |
| Clarity of Scott paste, percent transmission | 70 |

As indicated by the above analyses, the product formed a thick, translucent paste upon gelatinization in an aqueous medium.

EXAMPLE 11

The same procedure was used as in Example 10 except 1000 parts of corn (maize) starch, containing 6.1 percent moisture as is and 63 parts of sodium tripolyphosphate and 25.3 parts of sodium trimetaphosphate, as indicated by a phosphorus content of 0.93 percent, dry basis, was supplied continuously to the vibrating conveyor, equipped with mixing elements, at a rate of 150 pounds per hour per foot of conveyor width. The cooled simple and cross-linked orthophosphate ester of starch was washed to remove unreacted salts and the properties of the purified product are given in Table XIV.

*Table XIV*

| | |
|---|---|
| Moisture content of cooled product, percent as is | 0.24 |
| Phosphorus content of purified products, percent D.B | 0.38 |
| 3-gram Scott of purified product. sec./50 ml | 127 |
| Clarity of Scott paste, percent transmission | 54 |

As shown by the above analyses, the product forms a thick, semi-translucent paste.

EXAMPLE 12

A starch paste containing 1000 parts of grain sorghum starch and 3.5 parts of tetrasodium pyrophosphate and 2.5 parts of disodium dihydrogen pyrophosphate was spray dried to yield a white powder containing about 5 percent moisture. Analysis of the alcohol purified product for phosphorus showed 0.091 percent, dry basis.

The spray-dried product was supplied continuously to the vibrating conveyor equipped with mixing elements at a rate of 165 pounds per hour per foot of conveyor width. The ¼-inch eccentric was operated at 610 r.p.m. resulting in a retention time on the conveyor of 3.0 minutes. The material was heated by infrared generators mounted above the reaction surface, resulting in a maximum product temperature of 157° C. The cooled product contained approximately 1 percent moisture.

The product produced by the thermal modification was substantially odorless and tasteless and formed a much more viscous colloidal mass when stirred into cold water than the unmodified material. The paste or sol was exceptionally homogeneous and smooth and proved to be a relatively efficient emulsification agent, particularly for oil in water emulsions as in the preparation of salad dressing.

The alcohol purified product had a phosphorus content of 0.102 percent indicating that additional phosphorylation occurred during the thermal modification.

Some of the more important characteristics of our invention are as follows:

The material being treated is transported at an overall rate of travel of from about two to about twenty feet per minute. The eccentric which produces oscillation of the conveyor and thereby vibrations of the material under treatment rotates at the rate of about 425 to about 710 revolutions per minute. The throw of the eccentric producing the aforesaid oscillations is from about 1/8" to about 1/2".

During thermal modification, the initial temperature of the reaction surface transporting the product should not exceed 230° C. for starch or starch derivatives containing 3% moisture, nor 175° C. for starch or starch derivatives containing 12% moisture. The temperature of the product should not exceed 230° C. at any time. It is to be noted that a temperature of at least about 95° C. is required to produce any reaction of the material being treated. The thickness of the bed on the moving conveyor surface is about 2 to 18 mm. The mixing elements which are disposed transversely to the longitudinal run of the conveyor may assume various shapes and dimensions. They must be effective across the width of the layer of material, so as to get a substantially uniform effect across the width of the bed. They are part of the treating surface, in that they convey heat from the heatant to the material under treatment. The width and height and shape of the working surfaces of these elements may be varied, but they must be of such low angularity on the acclivity as to allow the material to climb up on and over the top of the barrier which they present. The shape and angularity of the break angle and of the declivity must be such as to produce a breaking, crumbling and mixing effect of the layer of material under treatment, and of such obtuse angularity at the junction of the declivity with the bottom wall that no dead pocket or lodgment of the material will occur. The generation of any substantial amount of dust is to be avoided. We find that dust is formed if the break angle at the top of the elements is too sharp. In general, an angle of 90° or greater will avoid dust.

The spacing of the mixing elements on the conveyor bottom must be such as to allow sufficient frictional grip of the conveyor surface upon the material to produce a pileup on the acclivity of the mixing elements, and at the same time the spacing must be enough to permit a thinning out of the layer of material on the declivity side in order to secure the mixing effect. The thinning out on the declivity side of the mixing elements produces mixing up and down, and permits equalization sidewise. A complete intermixing is effected by passage of the material over about four such mixing elements.

A horizontal position of the conveyor bottom is preferable primarily because it minimizes variables, but it is not essential to the practice of our invention.

The foregoing description of specific structural details of our apparatus and of specific steps or conditions of operation of our process are not intended to be limiting, but are illustrative of the invention defined in the following claims.

We claim:

1. A process for producing ethers of starch which comprises transporting a mixture of starch and formaldehyde containing not more than about 8 percent of moisture in a thin layer of from 2 to 18 mm. thick across a straight horizontally mounted reaction surface while heating said mixture at a temperature between about 135° C. and about 230° C., said surface being interrupted by ridges extending across the width of the layer which effects a spalling and crumbling action on the mixture as it is moved over said ridges to induce a redistribution and internal mixing of the starch and formaldehyde within said layer, effecting movement of said mixture across said reaction surface and over said ridges by vibrating said reaction surface, said vibrations having a frequency of from 475 to 710 per minute and an amplitude of from 1/8 to 1/2 inch, and cooling the resulting starch ether.

2. In a process for producing orthophosphate esters of starch the step of thermal modification which comprises causing a stream of granular starch containing an added phosphate salt, said phosphate salt being from the group consisting of metaphosphates, polymetaphosphates, pyrophosphates, tripolyphosphates and mixtures thereof, to flow in a thin layer from 2 to 18 mm. thick along a conveyor having a flat reaction surface interrupted by transverse mixing elements in the form of ridges which produce a breaking, crumbling and mixing effect on the granular starch as it is moved upwardly and over said ridges, heating said granular starch to a temperature of from 120° C. to 205° C. while effecting movement of said granular starch along said reaction surface and over said ridges by vibration of said conveyor at a frequency of from 475 to 710 cycles per minute and at an amplitude of from 1/8 to 1/2 inch, moving of the stream over the ridges effecting an internal mixing and redistribution of the granular starch thereby to promote heating of the stream through the thickness thereof and cooling the resulting orthophosphate esters of starch when the desired extent of phosphorylation is achieved.

3. The step of claim 2 wherein the starch undergoing treatment is pre-gelatinized in the presence of a phosphate salt from the group consisting of metaphosphates, polymetaphosphates, pyrophosphates, tripolyphosphates, and mixtures thereof and dried.

4. The step of claim 2 characterized by the pH of the starch undergoing treatment being within the range of 4 to 11.5.

5. A process for producing esters of starch which comprises moving a mixture of starch and a water soluble acid salt of an inorganic polybasic oxyacid in the ortho form in a thin layer along a flat heated conveyor surface in the form of a shallow stream, the moisture content of said mixture being not more than about 5% during esterification, said conveyor surface being heated within the range of about 160° C. to about 200° C. and the pH during the heating not exceeding about 8.5, and at spaced points along said stream breaking the starch mixture of the stream into fragments crumbling the fragments and redistributing the crumbled fragments on the conveyor surface to produce repeated internal mixing actions on the layer as it is moved along said conveyor whereby to promote a uniformity of heating of all portions of the starch and salt.

6. The method of producing degradation products of a compound selected from the group consisting of starch products and their derivatives, which comprises heating said compound while the same is in from semi-dry to dry particulate form to a temperature between 95° C. and 230° C., while transporting said particulate solids in thin layers across a straight, horizontally mounted reaction surface, continually mixing said compounds internally of the layers while the same are being transported by causing the layers to be raised and then dropped so as to spall into fragments which crumble and become redistributed through the thickness of the layer, so as to promote a uniformity of heating of all portions of the transported compounds, effecting movement of said compounds across said reaction surface by vibrating said reaction surface, said vibrations having a frequency of 425 to 710 r.p.m. and an amplitude of from ⅛ to ½ inch.

7. In a process for dextrinizing starch, the step of thermal modification of acidified starch to dextrins wherein a stream of said acidified starch is caused to flow in a layer of from 2 to 18 mm. thick across a straight horizontal reaction surface periodically interrupted by transverse ridges which extend across the width of the layer, heating said stream of acidified starch at a temperature between about 95° C. and about 230° C., effecting movement of said stream of starch to be dextrinized across said reaction surface and over said ridges by vibrating said reaction surface, said vibrations having a frequency of 475 to 710 per minute and an amplitude of from ⅛ to ½ inch, said ridges effecting a breaking, crumbling and internal mixing action on the starch as the layer is moved thereover, and cooling the resulting dextrinized starch when the desired degree of dextrinization is achieved.

8. Process according to claim 7 wherein the acid is present in the acidified starch in an amount equivalent to 28 to 60 grams of anhydrous hydrogen chloride gas per 100 pounds of starch dry substance.

9. In a process for producing modified carbohydrate materials from dried starch conversion sirup solids, the step of thermal modification comprising blowing a stream of acidified sirup solids of from 2 to 18 mm. thick across a straight, horizontally mounted reaction surface having spaced transversely extending ridges while heating said sirup solids at a temperature between about 120° C. and about 230° C., effecting movement of said stream of sirup solids across said reaction surface and over the ridges by vibrating said reaction surface, said vibration having a frequency of from 475 to 710 per minute and an amplitude of from ⅛ to ½ inch, said ridges effecting a spalling, crumbling and internal mixing action on the solids as the stream is moved thereover and cooling the resulting modified carbohydrate material when the desired extent of modification is achieved.

10. In a process for producing modified carbohydrate materials from dried starch conversion sirup solids containing added formaldehyde, the step of thermal modification comprising transporting acidified sirup solids containing added formaldehyde in a thin layer of from 2 to 18 mm. thick across a straight horizontally mounted reaction surface having spaced ridges extending transversely across the width of the layer while heating said sirup solids at a temperature between about 135° C. and about 230° C., effecting movement of said sirup solids containing formaldehyde across said reaction surface and over the ridges by vibrating said reaction surface, the layer being spalled into fragments which crumble and are internally mixed into the layer as it is moved over said ridges, said vibrations having a frequency of from 475 to 710 per minute and an amplitude of from ⅛ to ½ inch, and cooling the resulting modified carbohydrate material when the desired extent of modification is achieved.

11. Method of modifying carbohydrate material which comprises providing a generally flat-like horizontal heated reaction surface with means thereon for contacting and subsequently mixing said material, disposing particulate carbohydrate material in a thin layer on said reaction surface, subjecting said surface to vibrations vertically to levitate the layer of particulate carbohydrate material to reduce its apparent density, and horizontally to propel said particulate material forwardly along said heated reaction surface at a continuous rate, while at spaced intervals along said surface equal to several times the thickness of said layer causing the entire width of the layer to climb to a new height such as to produce its temporary deceleration and a resultant thickening in the dimension and density of the layer across its said entire width, and then allowing the thus thickened portion of layer to fall off so as to break up into transverse fragments which spall off the advancing face of the layer across its width and crumble to produce a new distribution and internal mixing of the granules through said layer as it is propelled forwardly along said heated reaction surface.

12. Method according to claim 11 wherein the angles at which the layer of particulate carbohydrate material is caused to climb and thereafter to spall off is so controlled as to prevent pocketing of portions of the layer as it is propelled along the heated reaction surface.

13. In a method of modifying carbohydrate material, the steps which comprise feeding the carbohydrate material in pulverulent form onto one end of a generally flat, horizontally disposed reaction surface having transversely extending ridges extending all the way across said surface at spaced intervals along the length thereof, said ridges presenting a gradually inclined surface on the side thereof toward said end and a second obliquely declined surface on the side thereof away from said end, the two surfaces being obtusely angled with respect to each other, causing said material to flow in the form of a sheet of essentially uniform depth across the reaction surface, applying heat to said sheet, and causing said sheet to climb said inclined surface of each of the ridges to produce a temporary deceleration and a resultant thickening of the sheet across its width and then to rapidly move down the second surface of the ridges to effect a fracturing and spalling of the sheet into slabs across its width which crumble and fall to effect an internal mixing and redistribution of the pulverulent material through the cross section of the sheet thereby bringing different portions of the sheet into direct exposure to the heat.

14. Method of modifying carbohydrate material which comprises providing a flat heated conveyor surface with means thereon for contacting and subsequently mixing said material, causing said material to flow in a thin layer along said surface in the form of a shallow stream and at spaced points along said surface raising the material of said layer from the level of the stream across its entire width, thereby breaking it into fragments across said entire width, crumbling the fragments and dropping the crumbled fragments back upon the conveyor surface whereby the material is mixed.

15. The method of claim 14 wherein the stream of material is progressively heated to raise its temperature along the initial part of its travel.

16. The method of claim 14 wherein a catalyst is present during modification.

17. Method of rapidly removing moisture from starch containing free moisture which comprises providing a generally flat striplike conveyor surface with means thereon for contacting and subsequently mixing said starch, disposing the starch in a thin continuous layer on said conveyor surface, heating said conveyor surface to a temperature of from about 100° C. to about 230° C., subjecting the starch to vibration vertically to levitate the starch and to reduce its apparent density, and horizontally to propel it along said striplike surface, and at spaced points along said strip-like surface raising the material of said layer across its entire width, breaking it into fragments across said entire width, and dropping the fragments back upon the surface causing them to crumble and become redistributed through the thickness of the horizontally propelled layer.

References Cited in the file of this patent

UNITED STATES PATENTS

| | | |
|---|---|---|
| 957,232 | Matheson | May 10, 1910 |
| 1,644,113 | Deister | Oct. 4, 1927 |
| 1,720,131 | Lemont | July 9, 1929 |
| 1,894,571 | Phillips | Jan. 17, 1933 |

(Other references on following page)

UNITED STATES PATENTS

| | | |
|---|---|---|
| 1,899,952 | Giesecke | Mar. 7, 1933 |
| 2,094,786 | Flint | Oct. 5, 1937 |
| 2,157,339 | Jeffrey et al. | May 9, 1939 |
| 2,163,556 | Glaze | June 20, 1939 |
| 2,373,452 | Bouwer | Apr. 10, 1945 |
| 2,376,378 | Murray | May 22, 1945 |
| 2,714,962 | Sides | Aug. 9, 1955 |
| 2,801,242 | Kerr et al. | July 30, 1957 |
| 2,818,357 | Ziegler et al. | Dec. 31, 1957 |
| 2,819,047 | Carrier | Jan. 7, 1958 |
| 2,836,591 | Durand | May 27, 1958 |
| 2,845,417 | Kesler et al. | July 29, 1958 |
| 2,853,485 | Werner et al. | Sept. 23, 1958 |
| 2,882,024 | Behrens et al. | Apr. 14, 1959 |
| 2,884,413 | Kerr et al. | Apr. 28, 1959 |